(12) United States Patent
Nagashima et al.

(10) Patent No.: US 8,110,257 B2
(45) Date of Patent: Feb. 7, 2012

(54) INK-JET RECORDING METHOD, INK-JET RECORDING APPARATUS AND RECORDED MATTER

(75) Inventors: Hidefumi Nagashima, Atsugi (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 318 days.

(21) Appl. No.: 12/376,439

(22) PCT Filed: Jun. 26, 2008

(86) PCT No.: PCT/JP2008/062032
§ 371 (c)(1),
(2), (4) Date: Feb. 5, 2009

(87) PCT Pub. No.: WO2009/001967
PCT Pub. Date: Dec. 31, 2008

(65) Prior Publication Data
US 2010/0196673 A1    Aug. 5, 2010

(30) Foreign Application Priority Data
Jun. 26, 2007   (JP) ................................ 2007-167130

(51) Int. Cl.
*B41M 5/00* (2006.01)
(52) U.S. Cl. ............... 428/32.19; 428/32.22; 428/32.26; 428/32.33; 428/32.35; 428/32.36; 347/20; 347/101; 347/105; 347/106
(58) Field of Classification Search ............... 428/32.19, 428/32.22, 32.26, 32.33, 32.35, 32.36; 347/20, 347/101, 105, 106
See application file for complete search history.

(56) References Cited

U.S. PATENT DOCUMENTS

| 2005/0128272 | A1 |   | 6/2005 | Morohoshi et al. |
| 2007/0040882 | A1 |   | 2/2007 | Kanaya et al. |
| 2007/0197685 | A1 | * | 8/2007 | Aruga et al. ................. 523/160 |

FOREIGN PATENT DOCUMENTS

| JP | 10 140064 |   | 5/1998 |
| JP | 2000 198227 |   | 7/2000 |
| JP | 2002-067473 A | * | 3/2002 |
| JP | 2002 113850 |   | 4/2002 |
| JP | 2002 327138 |   | 11/2002 |
| JP | 2004 249612 |   | 9/2004 |
| JP | 2006 168372 |   | 6/2006 |
| JP | 2006 182026 |   | 7/2006 |
| JP | 2006 231733 |   | 9/2006 |
| JP | 2006 316246 |   | 11/2006 |
| JP | 2007 50652 |   | 3/2007 |
| WO | 02 26898 |   | 4/2002 |
| WO | 2004 018211 |   | 3/2004 |

* cited by examiner

*Primary Examiner* — Betelhem Shewareged
(74) *Attorney, Agent, or Firm* — Oblon, Spivak, McClelland, Maier & Neustadt, L.L.P.

(57) ABSTRACT

An ink-jet recording method including recording onto a recording medium a black image of composite black using a black ink and color inks, wherein the black ink includes water, a water-soluble organic solvent, a surfactant, and a carbon black whose volume average particle diameter is 40 nm to 100 nm, and the color inks include a cyan ink, a magenta ink and a yellow ink, wherein the mass ratio (A/B) of a solid content A to a water-soluble organic solvent content B in the black ink is in the range of 1/8 to 1/15, and wherein the recording medium includes a support with a coating layer, and the amounts of purified water transferred to the recording medium at contact periods of 100 ms and 400 ms at a temperature of 23 C and a relative humidity of 50% are 2 ml/m2 to 35 ml/m2 and 3 ml/m2 to 40 ml/m2 respectively.

20 Claims, 6 Drawing Sheets

INK-JET RECORDING METHOD, INK-JET RECORDING APPARATUS AND RECORDED MATTER

TECHNICAL FIELD

The present invention relates to an ink-jet recording method capable of obtaining a high image quality recorded matter that is excellent in image density, glossiness and reliability primarily to inexpensively available recording media such as gloss coated paper for use in commercial printing applications and that is close in quality to recorded matters produced by commercial printing such as web offset printing, with the use of an ink-jet recording apparatus.

BACKGROUND ART

Ink-jet recording is known as a superior recording method that is not much affected by the types of recorded materials. Recording apparatuses, recording methods, recording materials and the like based upon ink-jet recording have been actively studied and developed. At present, dye inks containing dyes as colorants are mainly used for ink-jet recording inks.

Meanwhile, recording media each including an ink absorption layer having voids for absorbing ink in a support base, and further including a porous glossy layer in accordance with the necessity are mainly used for ink-jet recording media. Paper of this type is designed placing importance on matching with dye inks which are currently popular, and already widely used as ink-jet paper, particularly as glossy paper. When such paper is used, very high-definition images superior in glossiness can be obtained; however, since materials therefor are very expensive and also production processes are complicated, the production cost thereof is very high in comparison with the production cost of gloss coated paper for use in commercial printing applications. For that reason, applications of such paper tend to be limited to the case where high-quality output is needed, which is exemplified by photographic output, and in reality it is difficult to use such paper in the field of commercial printing where mass production is required at low prices, which is exemplified by handbills, catalogues and pamphlets.

Also, as to the design concept for long-term storage stability of images produced, since dyes themselves are not highly resistant to ultraviolet rays or ozone, such a method is mainly employed that dyes are made to soak into ink receiving layers of the ink-jet recording media as deeply as possible so as to minimize the effects of the air and ultraviolet rays, and also the dyes are protected with an antioxidant or stabilizer that has been previously added into the ink receiving layers. For that reason, it is necessary to use large amounts of inks in which the concentration of colorants is lowered, and thus printing costs increase. Also, when images or the like are printed onto plain paper, there is a problem that the image quality lowers because of bleeding, for instance.

In order to solve such problems, pigment inks using pigments as colorants have been proposed for ink-jet recording inks in recent years. The pigment inks are superior to the dye inks in image density, water resistance and weatherability and make it possible to obtain images with less bleeding at the time of printing onto plain paper; however, at the time of printing onto recording media having coating layers, there are such problems that sufficient color-developing ability and glossiness cannot be obtained, and image-fixing ability degrades because it takes a longer time for the pigment inks to dry after printing.

Also in the case where black letters/characters, black lines and black images, generally used in many applications, are printed only using black pigment inks, the pigments flocculate and adhere in the vicinity of the surfaces of recording media; therefore, the surface state of recording media greatly affects the image density, and there are such troubles caused that the image density decreases and the image quality becomes poor especially at the time of printing onto recording media having coating layers. This tendency is conspicuous when the pigment concentration is reduced instead of increasing the nonvolatile content or sparingly volatile content (amount of wetting agents, excluding penetrants) in water-soluble organic solvents that are components of the black pigment inks as an attempt to improve ejection reliability and lower the costs of the black pigment inks, which are most frequently used.

In order to solve such problems, Patent Literature 1 to Patent Literature 3 propose ink-jet recording methods, each of which is a method wherein a black ink containing a black pigment, and color inks containing dyes of cyan, magenta and yellow are prepared, and an image is recorded onto a recording medium. However, these proposals in related art are not characterized by using pigment inks for all colors; also, dyes themselves are not highly resistant to ultraviolet rays or ozone, so that the use of dyes for color inks makes it necessary, for the same reason as described above, to use large amounts of inks in which the concentration of colorants is lowered, and thus there is such a drawback that printing costs increase.

Patent Literature 4 discloses that it is possible to obtain printed text having a high density and superior light resistance by printing a black image of composite black with the use of a combination of a self-dispersible black pigment ink and resin-coated color pigment inks. However, the pigment concentration of the black ink described in Examples is not lower than 4% by mass, and use of a black ink having a pigment concentration of 3% by mass or less as in recording inks of the present invention is not stated.

Patent Literature 5 proposes use of a self-dispersible pigment or a colorant coated with a polymer as an ink-jet recording method for obtaining sufficient image density, not affected by the types of media such as plain paper and glossy media. According to this proposal, a black image of composite black can be obtained mainly by means of inks which have colors other than black and contain colorants coated with a polymer, when the medium used is a glossy medium; however, the ink-jet recording method is different from the method for obtaining a recorded matter superior in image density and glossiness by printing an image of composite black with the use of inks including a black ink, at which the present invention is aimed.

Patent Literature 6 discloses that glossiness and image clarity on ink-jet paper such as glossy paper or photo paper can be improved by employing a recording solution containing a water dispersion of water-insoluble vinyl polymer particles. In the method for obtaining a black image of composite black by using this recording solution, the black image is printed using an ink set provided with a magenta ink, a yellow ink and a cyan ink; therefore, unlike the present invention, it is not that a recorded matter superior in image density and glossiness is obtained by printing an image of composite black with the use of inks including a black ink. Moreover, recording media in Patent Literature 6 are ink-jet paper such as glossy paper or photo paper, which is different from inexpensively available gloss coated paper in the present invention for use in commercial printing applications.

Patent Literature 7 proposes an ink-jet recording apparatus for printing high-quality images, wherein a printing head is provided with two black ink nozzles for ejecting two different black inks, edge areas of a black area that is a recording target are recorded using a black pigment ink serving as a second black ink, and an inner area sandwiched between the edge areas is recorded, alternately using the second black ink and a black dye ink serving as a first black ink which is higher in penetrating speed than the second black ink. However, the ink-jet recording method in this proposal is different from the method for obtaining a black image of composite black formed using a combination of a black ink and color inks as in recording inks of the present invention; also, there might be a concern that due to the use of dye ink, images produced in the proposal would be poorer in image storage stability than images formed only using pigment inks.

As just described, it is, in reality, still difficult to obtain a high image quality recorded matter that is excellent in image density, glossiness and reliability on recording media and that is close in quality to recorded matters produced by commercial printing such as web offset printing.

[Patent Literature 1] Japanese Patent Application Laid-Open (JP-A) No. 2000-198227
[Patent Literature 2] JP-A No. 2006-168372
[Patent Literature 3] JP-A No. 2006-182026 [Patent Literature 4] International Publication No. WO2002/026898
[Patent Literature 5] JP-A No. 2002-327138
[Patent Literature 6] JP-A No. 2006-316246
[Patent Literature 7] JP-A No. 2002-113850

DISCLOSURE OF INVENTION

An object of the present invention is to provide an ink-jet recording method capable of obtaining a high image quality recorded matter that is excellent in image density, glossiness, image quality and reliability primarily to inexpensively available recording media such as gloss coated paper for use in commercial printing applications and that is close in quality to recorded matters produced by commercial printing such as web offset printing, with the use of an ink-jet recording apparatus; and to provide an ink-jet recording apparatus.

As a result of carrying out earnest examinations to solve the above-mentioned problems, the present inventors have found that it is possible to obtain a recorded matter which is high in image density and excellent in glossiness, image quality and reliability by printing with recording inks primarily onto an inexpensively available recording medium such as gloss coated paper for use in commercial printing applications, wherein the recording inks contain a carbon black having a volume average particle diameter in a specific range, a water dispersion having a solid content and a water-soluble organic solvent concentration in specific ranges, and color pigment inks of cyan, magenta and yellow. Also, they have found that it is possible to obtain a printed matter which is even higher in image density and image quality and excellent in pigment fixing property by adding resin fine particles to the recording inks so as to make a pigment retained in the vicinity of the surface of a recording medium.

The present invention is based upon the aforementioned findings of the present inventors, and means for solving the above-mentioned problems are as follows.

<1> An ink-jet recording method including recording onto a recording medium a black image of composite black using a combination of a black ink and color inks, wherein the black ink includes water, a water-soluble organic solvent, a surfactant, and a carbon black whose volume average particle diameter is 40 nm to 100 nm, and the color inks include a cyan ink containing a cyan pigment, a magenta ink containing a magenta pigment, and a yellow ink containing a yellow pigment, wherein the mass ratio (A/B) of a solid content A in the black ink to a water-soluble organic solvent content B in the black ink is in the range of 1/8 to 1/15, and wherein the recording medium includes a support, and a coating layer applied onto at least one surface of the support, the amount of purified water transferred to the recording medium at a contact period of 100 ms measured by a dynamic scanning absorptometer at a temperature of 23° C. and a relative humidity of 50% is 2 ml/m$^2$ to 35 ml/m$^2$, and the amount of purified water transferred to the recording medium at a contact period of 400 ms measured by the dynamic scanning absorptometer at a temperature of 23° C. and a relative humidity of 50% is 3 ml/m$^2$ to 40 ml/m$^2$.

<2> The ink-jet recording method according to <1>, wherein the black ink and the color inks contain resin fine particles whose volume average particle diameter is 10 nm to 300 nm.

<3> The ink-jet recording method according to <2>, wherein the mass ratio (C/D) of a carbon black content C in the black ink to a resin fine particle content D in the black ink is in the range of 1/0.05 to 1/2.

<4> The ink-jet recording method according to any one of <2> and <3>, wherein the resin fine particles are selected from acrylic resin fine particles, methacrylic resin fine particles, styrene resin fine particles, urethane resin fine particles, acrylamide resin fine particles, polyester resin fine particles, butadiene resin fine particles, and resin fine particles produced by mixing these fine particles.

<5> The ink-jet recording method according to any one of <1> to <4>, wherein the carbon black is coated with a water-insoluble vinyl polymer.

<6> The ink-jet recording method according to any one of <1> to <4>, wherein the carbon black has a hydrophilic group on its surface, and the hydrophilic group is a functional group selected COOH, $SO_3M$, $SO_3H$, $-PO_3HM$, $-PO_3M_2$, $-PO_3H_2$, $-SO_2NH_2$ and $-SO_2NHCOR$, where M denotes an alkali metal, ammonium or an organic ammonium, and R denotes an alkyl group having 1 to 12 carbon atoms, a phenyl group that may have a substituent, or a naphthyl group that may have a substituent.

<7> The ink-jet recording method according to any one of <1> to <4>, wherein the carbon black is dispersed by means of the surfactant.

<8> The ink-jet recording method according to any one of <1> to <4>, wherein the carbon black has a graft polymer group on its surface.

<9> The ink-jet recording method according to any one of <1> to <4>, wherein the black ink includes one of a polymeric dispersant having an anionic group or cationic group on its surface, and a carbon black whose surface is directly or indirectly coated with a compound having an anionic group or cationic group.

<10> The ink-jet recording method according to any one of <1> to <9>, wherein the water-soluble organic solvent is at least one selected from the group consisting of glycerin, ethylene glycol, diethylene glycol, triethylene glycol, propylene glycol, dipropylene glycol, tripropylene glycol, 2-methyl-1,3-propanediol, 1,3-butanediol, 2,3-butanediol, 1,4-butanediol, 2-methyl-1,3-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone and N-hydroxyethyl-2-pyrrolidone.

<11> The ink-jet recording method according to any one of <1> to <10>, wherein the inks have a viscosity of 5 mPa·s to 20 mPa·s at 25° C.

<12> The ink-jet recording method according to any one of <1> to <11>, wherein the coating layer of the recording medium has a solid content of 0.5 g/m² to 20.0 g/m², and the recording medium has a basis weight of 50 g/m² to 250 g/m².
<13> The ink-jet recording method according to any one of <1> to <12>, wherein the amount of ink attached to the recording medium is 1.5 g/m² to 15 g/m².
<14> An ink-jet recorded matter recorded by the ink-jet recording method according to any one of <1> to <13>, including a solid recorded portion having an image density of 2.0 or greater and a glossiness of 50 or greater at a light incidence angle of 60°.
<15> An ink-jet recording apparatus for obtaining the ink-jet recorded matter according to <14>, including an ink jetting unit configured to jet the inks so as to record an image, by applying a stimulus to the inks.
<16> The ink-jet recording apparatus according to <15>, wherein the stimulus is at least one selected from heat, pressure, vibration and light.
<17> The ink-jet recording apparatus according to any one of <15> and <16>, further including a reversing unit configured to reverse a recording surface of the recording medium and thus enable double-sided printing.
<18> The ink-jet recording apparatus according to any one of <15> to <17>, wherein a head for jetting the inks has a nozzle plate in which an ink ejection surface has been subjected to water-repellent treatment.
<19> The ink-jet recording apparatus according to <18>, wherein the water-repellent treatment is selected from the group consisting of PTFE-Ni eutectoid plating, fluorine resin treatment and silicone resin treatment.
<20> The ink-jet recording apparatus according to any one of <15> to <19>, further including an endless conveyance belt, and a conveyance unit configured to convey the recording medium by charging a surface of the conveyance belt so as to hold the recording medium.
<21> The ink-jet recording apparatus according to any one of <18> to <20>, further including a sub-tank for supplying ink onto the head, wherein the sub-tank is replenished with ink from an ink cartridge via a supply tube.

The present invention makes it possible to provide an ink-jet recording method capable of obtaining, by ink-jet recording, a high image quality recorded matter that is excellent in image density, glossiness, image quality and reliability primarily to inexpensively available recording media such as gloss coated paper for use in commercial printing applications and that is close in quality to recorded matters produced by commercial printing such as web offset printing, with the use of inks composed of a specific black ink, and color inks including a cyan ink, a magenta ink and a yellow ink, in which all colorants are made of pigments; and to provide an ink-jet recording apparatus.

BEST MODE FOR CARRYING OUT THE INVENTION

Ink-jet Recording Method

Figure 1:
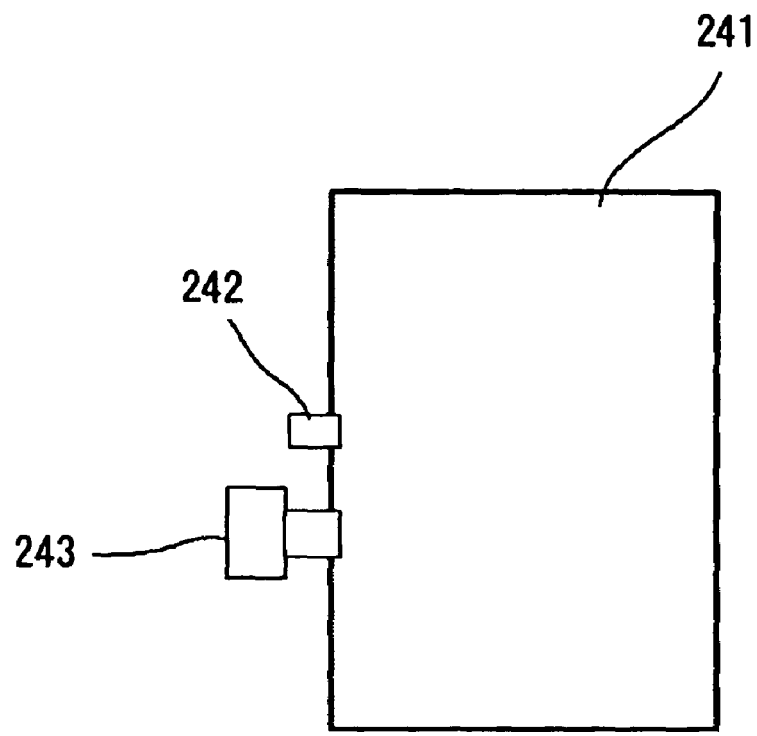
FIG. 1 is a schematic diagram showing one example of an ink cartridge of the present invention.

The present invention provides an ink-jet recording method for obtaining an recorded matter by jetting droplets of recording inks from an ink-jet recording apparatus and attaching these droplets onto a recording medium, wherein there are used at least a black ink including water, a water-soluble organic solvent, and a carbon black having a volume average particle diameter in a specific range, and color inks including a cyan ink, a magenta ink and a yellow ink, and wherein the amount of purified water transferred to the recording medium at a contact period of 100 ms measured by a dynamic scanning absorptometer at a temperature of 23° C. and a relative humidity of 50% is 2 ml/m² to 35 ml/m², and the amount of purified water transferred to the recording medium at a contact period of 400 ms measured by the dynamic scanning absorptometer at a temperature of 23° C. and a relative humidity of 50% is 3 ml/m² to 40 ml/m².

[Recording Medium]

The recording medium includes a support, and a coating layer applied onto at least one surface of the support, and further includes other layers in accordance with the necessity.

As to the recording medium, the amount of the inks of the present invention transferred to the recording medium at a contact period of 100 ms measured by a dynamic scanning absorptometer is preferably 2 ml/m² to 40 ml/m², more preferably 3 ml/m² to 30 ml/m². Also, the amount of purified water transferred to the recording medium at a contact period of 100 ms measured by the dynamic scanning absorptometer is preferably 2 ml/m² to 35 ml/m², more preferably 3 ml/m² to 30 ml/m².

When the amount of the inks and purified water transferred at the contact period of 100 ms is too small, beading (nonuniformity of density) may easily arise. When it is too large, the ink dot diameter after recording may become far smaller than desired.

The amount of the inks of the present invention transferred to the recording medium at a contact period of 400 ms measured by the dynamic scanning absorptometer is preferably 3 ml/m² to 50 ml/m², more preferably 4 ml/m² to 40 ml/m². Also, the amount of purified water transferred to the recording medium at a contact period of 400 ms measured by the dynamic scanning 3 ml/m² to 40 ml/m², more preferably 4 ml/m² to 35 ml/m².

When the amount of the inks and purified water transferred at the contact period of 400 ms is too small, sufficient drying properties cannot be obtained, and thus spur marks may easily appear. When it is too large, the glossiness of an image portion after dried may easily lower.

Here, the dynamic scanning absorptometer (DSA, Japan TAPPI Journal, vol. 48, May 1994, pp. 88-92, Shigenori Kuga) is an apparatus which can precisely measure the amount of liquid absorbed in a very short period of time. The dynamic scanning absorptometer automatically conducts the measurement by a method in which the rate of liquid absorption is directly read on the basis of the transfer of a meniscus in a capillary, a sample is shaped like a disc, a liquid absorption head is spirally moved for scanning on the sample, the scanning rate is automatically changed in accordance with a preset pattern, and measurement is repeated according to the required number of points per sample. A head for supplying liquid to a paper sample is connected to the capillary via a Teflon (trademark) tube, and the position of the meniscus in the capillary is automatically read by an optical sensor. Specifically, the amount of purified water transferred was measured using a dynamic scanning absorptometer (K350 series, type D, manufactured by Kyowaseiko Corporation). The transfer amount at a contact period of 100 ms and the transfer amount at a contact period of 400 ms can be calculated by means of interpolation based upon the measurement values of the transfer amounts at contact periods close to the abovementioned contact periods. The measurement was carried out at a temperature of 23° C. and a relative humidity of 50%.

—Support—

The support is not particularly limited and may be suitably selected in accordance with the intended use. Examples thereof include paper made mainly from wood fiber, and sheet-like materials such as unwoven fabrics made mainly from wood fiber and synthetic fiber.

The paper is not particularly limited and may be suitably selected from known materials in accordance with the intended use. For instance, wood pulp or recycled pulp is used therefor. Examples of the wood pulp include leaf bleached kraft pulp (LBKP), needle bleached kraft pulp (NBKP), NBSP, LBSP, GP and TMP.

Examples of the raw material for the recycled pulp include articles shown in the "Used Paper Standard Quality Specification List" released by Paper Recycling Promotion Center, such as high-quality white paper, white paper with lines and marks, cream-colored paper, card, medium-quality white paper, low-quality white paper, simili paper, white-colored paper, Kent paper, white art paper, medium-quality colored paper, low-quality colored paper, newspaper and magazine. Specific examples thereof include used paperboards and used papers of the following papers: printer papers such as uncoated computer paper, thermosensitive paper and pressure-sensitive paper that are related to information; OA (office automation) related papers such as paper for PPC (plain paper copier); coated papers such as art paper, coated paper, finely coated paper and matte paper; and uncoated papers such as high-quality paper, high color quality paper, notebook, letter paper, packing paper, fancy paper, medium-quality paper, newspaper, woody paper, super wrapping paper, simili paper, pure white roll paper and milk carton. More specific examples thereof include chemical pulp paper and high-yield pulp-containing paper. Each of these may be used alone or in combination with two or more.

The recycled pulp is generally produced by a combination of the following four steps.

(1) Defibration: used paper is treated with mechanical force and chemicals using a pulper and thusly fiberized, and printing ink is separated from the fiber.

(2) Dust removal: foreign matter (plastic, etc.) and dust contained in the used paper is removed by a screen, a cleaner or the like.

(3) Ink removal: the printing ink that has been separated from the fiber using a surfactant is removed from the system by a flotation method or washing method.

(4) Bleaching: the whiteness of the fiber is enhanced utilizing oxidation or reduction.

When the recycled pulp is mixed with other pulp, it is desirable that the mixture ratio of the recycled pulp in the whole pulp be 40% or less so as to prevent curl after recording.

For an internally added filler used in the support, a conventionally known pigment as a white pigment is used, for instance. Examples of the white pigment include white inorganic pigments such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate and magnesium hydroxide; and organic pigments such as styrene-based plastic pigments, acrylic plastic pigments, polyethylene, microcapsules, urea resins and melamine resins. Each of these may be used alone or in combination with two or more.

Examples of an internally added sizing agent used in producing the support include neutral rosin sizing agents used in neutral papermaking, alkenyl succinic anhydrides (ASA), alkyl ketene dimers (AKD) and petroleum resin sizing agents. Among these, neutral rosin sizing agents and alkenyl succinic anhydrides are particularly suitable. Although any of the alkyl ketene dimers only needs to be added in small amounts due to its strong sizing effect, it may be unfavorable in terms of conveyance at the time of ink-jet recording because the friction coefficient of a recording paper (medium) surface decreases and the surface easily becomes slippery.

—Coating Layer—

The coating layer includes a pigment and a binder, and further includes a surfactant and other components in accordance with the necessity.

For the pigment, an inorganic pigment or a combination of an inorganic pigment and an organic pigment can be used.

Examples of the inorganic pigment include kaolin, talc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide and chlorites. Among these, kaolin is particularly preferable in that it is superior in gloss developing property and makes it possible to yield a texture which approximates that of paper for offset printing.

Examples of the kaolin include delaminated kaolin, calcined kaolin, and engineered kaolin produced by surface modification or the like. In view of gloss developing property, it is desirable that 50% by mass or more of the whole kaolin be occupied by kaolin having a particle size distribution in which 80% by mass or more of the particles are 2 µm or less in diameter.

The amount of the kaolin added is preferably 50 parts by mass or more in relation to 100 parts by mass of the binder. When the amount is less than 50 parts by mass, sufficient effectiveness may not be obtained with respect to glossiness. Although the maximum value of the amount is not particularly limited, it is desirable in terms of coating suitability that the amount be 90 parts by mass or less, in view of the kaolin's fluidity, especially thickening properties in the presence of high shearing force.

Examples of the organic pigment include water-soluble dispersions containing styrene-acrylic copolymer particles, styrene-butadiene copolymer particles, polystyrene particles, polyethylene particles, etc. Each of these organic pigments may be used in combination with two or more.

The amount of the organic pigment added is preferably 2 parts by mass to 20 parts by mass in relation to 100 parts by mass of the whole pigment of the coating layer. The organic pigment is superior in gloss developing property and smaller in specific gravity than an inorganic pigment, thereby making it possible to obtain a coating layer which is bulky, highly glossy and excellent in surface coating property. When the amount is less than 2 parts by mass, such effects cannot be obtained. When it is greater than 20 parts by mass, the fluidity of a coating solution degrades, which leads to decrease in coating operationality and which is economically unfavorable as well.

Examples of the form of the organic pigment include dense type, hollow type and doughnut type. However, in light of a balance among the gloss developing property, the surface coating property, and the fluidity of the coating solution, it is desirable that the average particle diameter be 0.2 µm to 3.0 µm, and it is further desirable to employ a hollow type with a void ratio of 40% or more.

For the binder, an aqueous resin is preferably used.

For the aqueous resin, at least either a water-soluble resin or a water-dispersible resin can be suitably used. The water-soluble resin is not particularly limited and may be suitably selected in accordance with the intended use. Examples thereof include polyvinyl alcohol and modified products of polyvinyl alcohol such as anion-modified polyvinyl alcohol, cation-modified polyvinyl alcohol and acetal-modified polyvinyl alcohol; polyurethane; polyvinylpyrrolidone and modified products of polyvinylpyrrolidone such as copolymers of polyvinylpyrrolidone and vinyl acetate, copolymers of vinylpyrrolidone and dimethylaminoethyl methacrylate, copolymers of quaternized vinylpyrrolidone and dimethylaminoethyl methacrylate and copolymers of vinylpyrrolidone and methacrylamide propyl trimethyl ammonium chloride; celluloses such as carboxymethyl cellulose, hydroxyethyl cellulose and hydroxypropyl cellulose; modified products of cellulose such as cationated hydroxyethyl cellulose; synthetic resins such as polyester, polyacrylic acid (ester), melamine resins, modified products thereof, and copolymers of polyester and polyurethane; and poly(meth)acrylic acid, poly(meth)acrylamide, oxidized starch, phosphoric acid-esterified starch, self-modifying starch, cationated starch, various types of modified starch, polyethylene oxide, sodium polyacrylate and sodium alginate. Each of these may be used alone or in combination with two or more.

Among these, polyvinyl alcohol, cation-modified polyvinyl alcohol, acetal-modified polyvinyl alcohol, polyester, polyurethane, copolymers of polyester and polyurethane, and the like are particularly preferable in terms of ink absorption.

The water-dispersible resin is not particularly limited and may be suitably selected in accordance with the intended use. Examples thereof include polyvinyl acetate, ethylene-vinyl acetate copolymers, polystyrene, styrene-(meth)acrylic acid ester copolymers, (meth)acrylic acid ester polymers, vinyl acetate-(meth)acrylic acid (ester) copolymers, styrene-butadiene copolymers, ethylene-propylene copolymers, polyvinyl ethers and silicone-acrylic copolymers. Also, the water-dispersible resin may contain a crosslinking agent such as methylolated melamine, methylolated urea, methylolated hydroxypropylene urea or isocyanate or may be a copolymer with self-crosslinking ability that includes N-methylolacrylamide or other unit. A plurality of these aqueous resins can be used at the same time.

The amount of the aqueous resin added is preferably 2 parts by mass to 100 parts by mass, more preferably 3 parts by mass to 50 parts by mass, in relation to 100 parts by mass of the pigment. The amount of the aqueous resin added is determined such that the liquid absorption properties of the recording medium are within a desired range.

When a water-dispersible colorant is used as the colorant, a cationic organic compound is not necessarily required, and a cationic organic compound is not particularly limited and may be suitably selected in accordance with the intended use. Examples thereof include monomers, oligomers and polymers of primary to tertiary amines that form insoluble salts by reacting with functional groups such as sulfonic acid group, carboxyl group and amino group in direct dye or acid dye present in water-soluble ink; and monomers, oligomers and polymers of quaternary ammonium salts. Among these, oligomers and polymers are preferable.

Examples of the cationic organic compound include dimethylamine-epichlorhydrin polycondensates, dimethylamine-ammonia-epichlorhydrin condensates, poly(trimethylaminoethyl methacrylate-methylsulfate), diallylamine hydrochloride-acrylamide copolymers, poly(diallylamine hydrochloride-sulfur dioxide), polyallylamine hydrochloride, poly(allylamine hydrochloride-diallylamine hydrochloride), acrylamide-diallylamine copolymers, polyvinylamine copolymers, dicyandiamide, dicyandiamide-ammonium chloride-urea-formaldehyde condensates, polyalkylene polyamine-dicyandiamide ammonium salt condensates, dimethyldiallylammonium chloride, polydiallylmethylamine hydrochloride, poly(diallyldimethylammonium chloride), poly(diallyldimethylammonium chloride-sulfur dioxide), poly(diallyldimethylammonium chloride-diallylamine hydrochloride derivatives), acrylamide-diallyldimethylammonium chloride copolymers, acrylate-acrylamide-diallylamine hydrochloride copolymers, polyethylenimine, ethylenimine derivatives such as acrylamine polymers, and modified products of polyethylenimine alkylene oxides. Each of these may be used alone or in combination with two or more.

Among these, any one of low-molecular cationic organic compounds such as dimethylamine-epichlorhydrin polycondensates and polyallylamine hydrochloride and any one of relatively high-molecular cationic organic compounds such as poly(diallyldimethylammonium chloride) are preferably combined together. The combination makes it possible to increase image density more than in the case of independent use and further reduce feathering.

The cation equivalent of the cationic organic compound measured in accordance with a colloid titration method (using potassium polyvinyl sulfate and toluidine blue) is preferably 3 meq/g to 8 meq/g. When the cation equivalent is in this range, a favorable result can be obtained with respect to the range of the amount of the cationic organic compound dried and attached.

Here, in the measurement of the cation equivalent in accordance with the colloid titration method, the cationic organic compound is diluted with distilled water such that the solid content stands at 0.1% by mass, and pH adjustment is not made.

The amount of the cationic organic compound dried and attached is preferably 0.3 $g/m^2$ to 2.0 $g/m^2$. When the amount of the cationic organic compound dried and attached is less than 0.3 $g/m^2$, such effects as sufficient increase in image density and reduction in feathering may not be obtained.

The surfactant is not particularly limited and may be suitably selected in accordance with the intended use, and any one of an anionic surfactant, a cationic surfactant, an amphoteric surfactant and a nonionic surfactant can be used therefor. Among these, a nonionic surfactant is particularly preferable. By addition of the surfactant, the water resistance of images improves, image density increases, and bleeding can be reduced.

Examples of the nonionic surfactant include higher alcohol ethylene oxide adducts, alkylphenol ethylene oxide adducts, fatty acid ethylene oxide adducts, polyhydric alcohol fatty acid ester ethylene oxide adducts, higher aliphatic amine ethylene oxide adducts, fatty acid amide ethylene oxide adducts, ethylene oxide adducts of fats, polypropylene glycol ethylene oxide adducts, fatty acid esters of glycerol, fatty acid esters of pentaerythritol, fatty acid esters of sorbitol and sorbitan, fatty acid esters of sucrose, alkyl ethers of polyhydric alcohols, and fatty acid amides of alkanolamines. Each of these may be used alone or in combination with two or more.

The polyhydric alcohols are not particularly limited and may be suitably selected in accordance with the intended use. Examples thereof include glycerol, trimethylolpropane, pentaerythrite, sorbitol and sucrose. As to the ethylene oxide adducts, ones in which an alkylene oxide, for example propylene oxide or butylene oxide, is substituted for part of ethylene oxide to such an extent that their water solubility can be maintained are also effective. The substitution ratio is preferably 50% or less. The HLB (hydrophile-lipophile balance) of the nonionic surfactant is preferably 4 to 15, more preferably 7 to 13.

The amount of the surfactant added is preferably 10 parts by mass or less, more preferably 0.1 parts by mass to 1.0 part by mass, in relation to 100 parts by mass of the cationic organic compound.

Further, other components may be added to the coating layer in accordance with the necessity, to such an extent that the object and effects of the present invention are not impaired. Examples of the other components include additives such as alumina powder, a pH adjuster, an antiseptic agent and an antioxidant.

The method for forming the coating layer is not particularly limited and may be suitably selected in accordance with the intended use. For instance, a method in which the support is impregnated or coated with a coating layer solution can be employed. The method of impregnating or coating the support with the coating layer solution is not particularly limited and may be suitably selected in accordance with the intended use. For instance, the impregnation or the coating can be carried out using a coating machine such as a conventional size press, gate roll size press, film transfer size press, blade coater, rod coater, air knife coater, curtain coater or the like. Among these, in view of cost, the support is preferably impregnated or coated with the coating layer solution using a conventional size press, gate roll size press, film transfer size press, etc. installed in a papermaking machine, and finished using an on-machine coater.

The amount of the coating layer solution applied is not particularly limited and may be suitably selected in accordance with the intended use. It is preferably $0.5$ g/m$^2$ to 20 g/m$^2$, more preferably 1 g/m$^2$ to 15 g/m$^2$, as a solid content. When it is less than 0.5 g/m$^2$, the inks cannot be sufficiently absorbed, and thus the inks overflow, causing bleeding. When it is greater than 20 g/m$^2$, the texture of the paper is impaired, and thus there is caused a trouble that the paper becomes difficult to fold or write on using a writing instrument, for example.

If necessary, the coating layer solution may be dried after the impregnation or the coating, in which case the drying temperature is not particularly limited and may be suitably selected in accordance with the intended use, with the range of approximately 100° C. to 250° C. being preferable.

The recording medium may further include a back layer formed on the back surface of the support, and other layers formed between the support and the coating layer and between the support and the back layer. It is also possible to provide a protective layer on the coating layer. Each of these layers may be composed of a single layer or a plurality of layers.

Commercially available coated paper for offset printing, commercially available coated paper for gravure printing, or the like may be used for the recording medium, besides media for ink-jet recording, provided that its liquid absorption properties are within the above-mentioned ranges of the present invention. However, inexpensively available recording media such as gloss coated paper for use in commercial printing applications are particularly preferable.

Examples of the inexpensively available gloss coated paper for use in commercial printing applications include RICOH BUSINESS COAT GLOSS 100 (produced by Ricoh Company, Ltd.) and AURORA COAT (produced by Nippon Paper Industries Co., Ltd.).

The basis weight of the recording medium is preferably 50 g/m$^2$ to 250 g/m$^2$. When the basis weight is less than 50 g/m$^2$, the recording medium does not have sufficient elasticity, and thus a conveyance failure is liable to arise in which the recording medium jams a path of conveyance, for example. When it is greater than 250 g/m$^2$, the recording medium has excessive stiffness, and thus a conveyance failure is liable to arise in which the recording medium cannot turn appropriately at a curved portion lying in the path of conveyance and consequently jams the path, for example.

[Recording Ink]

—Black Ink—

The black ink includes water, a water-soluble organic solvent, a surfactant and a carbon black and further includes other components in accordance with the necessity.

The type of the carbon black used in the present invention is not particularly limited, and the carbon black is produced by a known method for producing carbon black, for example channel method, oil furnace method, furnace method, acetylene black method or thermal black method.

The carbon black used in the present invention is subjected to a surface modification process, and at least one hydrophilic group is bonded to the surface thereof directly or via other atomic group; therefore, the carbon black can be stably dispersed without using a dispersant.

Examples of the surface modification process include a process of oxidizing a carbon black by adding the carbon black into an aqueous solution of an oxidant containing an ammonium salt or an alkali metal salt such as hypochlorite, chlorite, chlorate, persulfate, perborate or percarbonate; a process of subjecting a carbon black to a low-temperature oxidation plasma treatment; and a process of oxidizing a carbon black with the use of ozone.

Examples of hydrophilic groups include —COOM, —COOH, —SO$_3$M, —SO$_3$H, —PO$_3$HM, —PO$_3$M$_2$, —PO$_3$H$_2$, —SO$_2$NH$_2$ and —SO$_2$NHCOR (M in the formulae denotes an alkali metal, ammonium or an organic ammonium. R denotes an alkyl group having 1 to 12 carbon atoms, a phenyl group that may have a substituent, or a naphthyl group that may have a substituent). Among these, use of —COOM and —SO$_3$M, each of which is bonded to the surface, is preferable.

Examples of "M" in the hydrophilic groups include lithium, sodium and potassium as alkali metals. Examples of the organic ammonium include monomethylammonium, trimethylammonium, monoethylammonium, triethylammonium, monomethanolammonium and trimethanolammonium. Also, there is a method of bonding the N-ethylpyridyl group represented by the following structural formula to the carbon black by treating the carbon black with 3-amino-N-ethylpyridinium bromide, and it is also possible to introduce a cationic hydrophilic group to the carbon black by making the carbon black and a diazonium salt react together. Preferable examples of the cationic hydrophilic group include quaternary ammonium groups, more preferably the quaternary ammonium groups shown below, and it is desirable that any one of these groups be bonded to a pigment surface to constitute a coloring material.

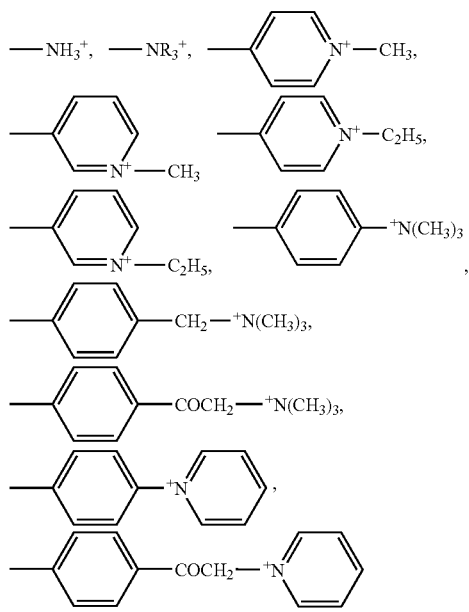

As to the method for producing a cationic carbon black dispersible in water without a dispersant, to which any of the hydrophilic groups is bonded, examples of methods of bonding the N-ethylpyridyl group represented by the following structural formula to a carbon black include a method of treating the carbon black with 3-amino-N-ethylpyridinium bromide. However, it goes without saying that the present invention is not confined thereto.

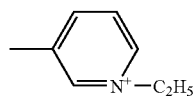

Also, the carbon black used in the present invention can be dispersed in an aqueous medium by means of a surfactant. For the surfactant, an anionic surfactant or a nonionic surfactant is mainly used; however, in the present invention, the surfactant of the present invention is not confined to these, and the surfactant may be a single surfactant or a combination of two or more surfactants.

Examples of the anionic surfactant include polyoxyethylene alkyl ether acetates, dodecylbenzene sulfonates, laurates, and salts of polyoxyethylene alkyl ether sulfates.

Examples of the nonionic surfactant include polyoxyethylene alkyl ethers, polyoxyethylene alkyl esters, polyoxyethylene sorbitan fatty esters, polyoxyethylene alkylphenyl ethers, polyoxyethylene alkylamines and polyoxyethylene alkylamides.

The carbon black used in the present invention can be dispersed in an aqueous medium when the recording inks include a polymeric dispersant, especially one that has an anionic group or cationic group on its surface, or by directly or indirectly coating the surface of the carbon black with a compound having an anionic group or cationic group.

Any compound can be used for the compound having an anionic group as long as it is a water-soluble resin having a function of stably dispersing pigment into water or an aqueous medium (in other words, having an anionic group). In particular, compounds which are in the range of 1,000 to 30,000 in mass average molecular weight are preferable, more preferably in the range of 3,000 to 15,000. Specific examples thereof include hydrophobic monomers such as styrene, styrene derivatives, vinylnaphthalene, vinylnaphthalene derivatives and aliphatic alcohol esters of α,β-ethylenic unsaturated carboxylic acids; block copolymers, graft copolymers and random copolymers, each one of which consists of two or more monomers selected from acrylic acid, acrylic acid derivatives, maleic acid, maleic acid derivatives, itaconic acid, itaconic acid derivatives, fumaric acid and fumaric acid derivatives; and salts thereof.

These resins are alkali-soluble resins that are soluble in an aqueous solution in which a base has been dissolved. Also, these resins may be homopolymers formed from hydrophilic monomers, or salts thereof. Also, water-soluble resins such as polyvinyl alcohol, carboxymethyl cellulose and naphthalene sulfonate formaldehyde condensate can be used therefor. However, when alkali-soluble resins are used, there are such advantages that the viscosity of dispersion solution can be lowered and dispersion can be facilitated. It is desirable that the amount of the water-soluble resin be in the range of 0.1% by mass to 5% by mass in relation to the total amount of ink (recording solution).

As a cationic pigment dispersant, a polymer formed from monomers selected from the cationic monomers explained below can be suitably used. Additionally, the molecular weight of the polymer is desirably 2,000 or greater.

Cationic monomers used in the present invention are quaternarized compounds based upon the monomers instanced below. To quaternarize the monomers below, it is advisable to treat the monomers in accordance with a common procedure, using methyl chloride, dimethyl sulfate, benzyl chloride, epichlorhydrin or the like. Examples of the monomers include N,N-dimethylaminoethylme thacrylate: 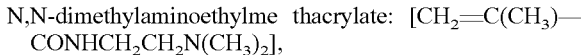
N,N-dimethylaminoethylacrylate: 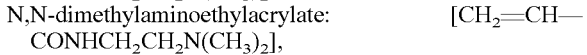
N,N-dimethylaminoacrylamide: $[CH_2=CH—CON(CH_3)_2]$,
N,N-dimethylaminopropylacrylamide: 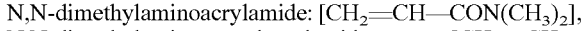
N,N-dimethylaminopropylmethacrylamide: 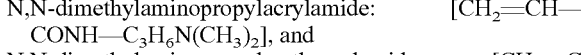

Also, the carbon black used in the present invention can be dispersed in an aqueous medium when the carbon black has a graft polymer group on its surface, or by directly or indirectly coating the surface with a water-insoluble polymer or graft polymer.

Examples of the graft polymer include acrylic acid acrylate-acrylonitrile copolymers, vinyl acetate-acrylic acid ester copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methylstyrene-acrylic acid copolymers, styrene-α-methylstyrene-acrylic acid copolymers-acrylic acid alkyl ester copolymers, styrene-maleic acid copolymers, vinylnaphthalene-maleic acid copolymers, vinyl acetate-ethylene copolymers, vinyl acetate-fatty acid vinyl ethylene copolymers, vinyl acetate-maleic acid ester copolymers, vinyl acetate-crotonic acid copolymers and vinyl acetate-acrylic acid copolymers.

Examples of a water-insoluble vinyl polymer that coats the carbon black used in the present invention include those having structural units derived from arylalkyl groups or acrylates containing aryl groups. Not limited thereto, the water-insoluble vinyl polymer may have a structural unit derived from a (meth)acrylate, an aromatic ring-containing monomer except styrene, a silicon macromer containing a polymerizable functional group at one terminal, and an alkyl methacrylate macromer, each of which includes an alkyl group having 1 to 20 carbon atoms, preferably 1 to 18 carbon atoms, and may include a monomer containing a salt-forming group, a styrene macromer, a hydrophobic monomer, (meth)acrylonitrile or hydroxy group.

Also, the volume average particle diameter of the carbon black in the recording inks is preferably 40 nm to 90 nm, more preferably 60 nm to 80 nm. When the volume average particle diameter is less than 40 nm, there is such a problem that it is difficult to secure dispersion stability, and that when printing is carried out using the recording inks, image fineness may be gained, but uniform images cannot be obtained, thus causing unevenness. When it is greater than 90 nm, there is such a problem that ejection stability decreases.

—Color Inks—

For the color inks including pigments of cyan, magenta and yellow in the present invention, water-dispersed materials of polymer fine particles containing coloring materials can be suitably used.

Here, the expression "polymer fine particles containing coloring materials" means either or both of a state in which the coloring materials are encapsulated in the polymer fine particles, and a state in which the coloring materials are adsorbed on the surface of the polymer fine particles. In this case, it is not that all the coloring materials, included in the inks of the present invention, need to be encapsulated in or adsorbed on the polymer fine particles but that the coloring materials may be dispersed in the emulsion to such an extent that the effects of the present invention are not impaired. The coloring materials are not particularly limited and may be suitably selected in accordance with the intended use, as long as they are insoluble or sparingly soluble in water and can be adsorbed onto the polymer fine particles.

Here, the expression "insoluble or sparingly soluble in water" herein means that not more than 10 parts by mass of the coloring materials dissolve in 100 parts by mass of water at 20° C. Additionally, the term "dissolve" herein means that neither division nor sedimentation of the coloring materials is confirmed by visual observation at the surface layer or bottom layer of the aqueous solution.

Examples of the polymer used for the polymer fine particles containing the coloring materials include those used as water-insoluble vinyl polymers that coat the carbon black.

The volume average particle diameter of the polymer fine particles containing the coloring materials (colored fine particles) is preferably 0.01 μm to 0.16 μm in the inks. When the volume average particle diameter is less than 0.01 μm, the fluidity of the fine particles increases, and thus bleeding may become conspicuous or there may be a degradation in light resistance. When it is greater than 0.16 μm, nozzles easily become clogged or color-developing ability may become poor.

Examples of the colors of the coloring materials include those of coloring materials for color. Each of these may be used alone or in combination with two or more.

As to the coloring materials for color, examples of coloring materials for yellow inks include C. I. Pigment Yellow 1 (Fast Yellow G), 3, 12 (Disazo Yellow AAA), 13, 14, 17, 23, 24, 34, 35, 37, 42 (yellow iron oxide), 53, 55, 74, 81, 83 (Disazo Yellow HR), 95, 97, 98, 100, 101, 104, 108, 109, 110, 117, 120, 128, 138, 150 and 153.

Examples of coloring materials for magenta inks include C. I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 101 (red ochre), 104, 105, 106, 108 (cadmium red), 112, 114, 122 (dimethyl quinacridone), 123, 146, 149, 166, 168, 170, 172, 177, 178, 179, 185, 190, 193, 209 and 219.

Examples of coloring materials for cyan inks include C. I. Pigment Blue 1, 2, 15 (Copper Phthalocyanine Blue R), 15:1, 15:2, 15:3 (Phthalocyanine Blue G), 15:4, 15:6 (Phthalocyanine Blue E), 16, 17:1, 56, 60 and 63.

As to the coloring materials for intermediate colors, examples of coloring materials for red, green and blue include C. I. Pigment Red 177, 194 and 224; C. I. Pigment Orange 43; C. I. Pigment Violet 3, 19, 23 and 37; and C. I. Pigment Green 7 and 36.

—Water-Soluble Organic Solvent—

For the water-soluble organic solvent, any of the following compounds is suitable in that superior effects can be obtained with respect to solubility and prevention of ejection failure caused by evaporation of moisture: glycerin, ethylene glycol, diethylene glycol, triethylene glycol, propylene glycol, dipropylene glycol, tripropylene glycol, 2-methyl-1,3-propanediol, 1,3-butanediol, 2,3-butanediol, 1,4-butanediol, 2-methyl-1,3-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone and N-hydroxyethyl-2-pyrrolidone. However, the water-soluble organic solvent is not limited thereto and may be suitably selected, provided that the object and effects of the present invention are not impaired. Also, each of these may be used alone or in combination with two or more, depending upon the necessity.

The amount of the water-soluble organic solvent contained in the recording inks is preferably 10% by mass to 50% by mass, more preferably 25% by mass to 45% by mass.

When the amount is too small, the nozzles easily become dry, thereby possibly causing ejection failure of droplets. When it is too large, the ink viscosity increases, possibly exceeding an appropriate viscosity range.

Examples of other water-soluble organic solvents, which may be used to such an extent that the object and effects of the present invention are not impaired, include polyhydric alcohols such as polyethylene glycol, polypropylene glycol, 1,3-propanediol, glycerol, 1,2,3-butanetriol and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether; polyhydric alcohol aryl ethers such as ethylene glycol monophenyl ether and ethylene glycol monobenzyl ether; nitrogen-containing heterocyclic compounds such as 1,3-dimethylimidazolidinone and ε-caprolactam; amides such as formamide, N-methylformamide and N,N-dimethylformamide; amines such as monoethanolamine, diethanolamine, triethanolamine, monoethylamine, diethylamine and triethylamine; sulfur-containing compounds such as dimethyl sulfoxide, sulfolane and thiodiethanol; propylene carbonate; and ethylene carbonate.

Each of these may be used alone or in combination with two or more, depending upon the necessity.

In the recording inks used in the present invention, a black ink whose pigment concentration is 3% by mass or less can be advantageously used.

Also, the mass ratio (A/B) of a solid content A in the black ink, which is a component of the recording inks, to a water-soluble organic solvent content B in the black ink is preferably in the range of 1/8 to 1/15; ideally, assuming that the mass ratio of the solid content in the black ink to the water-soluble organic solvent content in the black ink is satisfied as above, the mass ratio (E/F) of a solid content E for each of cyan, magenta and yellow in the color inks to a water-soluble organic solvent content F in the color inks is in the range of 1/1.5 to 1/3. Unless these relationships are satisfied, image quality decreases; also, the nozzles easily become dry, thereby possibly causing ejection failure of droplets, or the ink viscosity increases, possibly exceeding an appropriate viscosity range. Here, the solid content in each ink in the present invention primarily denotes a water-insoluble colorant and resin fine particles.

—Penetrant—

Further, in the recording inks of the present invention, it is possible to use a diol compound having 7 to 11 carbon atoms with the intention of improving penetrability. When the number of carbon atoms is less than 7, sufficient penetrability cannot be obtained, and thus a recording medium may be smeared at the time of double-sided printing; also, the inks do not spread sufficiently on a recording medium, and so images are not sufficiently filled with image elements, thereby possibly causing a degradation in letter/character quality and a decrease in image density. When it is greater than 11, the storage stability may degrade.

Suitable examples of the diol compound include 2-ethyl-1,3-hexanediol and 2,2,4-trimethyl-1,3-pentanediol.

The amount of the diol compound contained in the recording inks is preferably 0.1% by mass to 20% by mass, more preferably 0.5% by mass to 10% by mass. When the amount is too small, the penetrability of the inks to paper degrades; therefore, a recorded matter may be scratched by a roller in such a manner as to leave a smear when paper is conveyed, the inks may be attached to a conveyance belt in such a manner as to leave a smear when the recording surface of a recording medium is reversed for double-sided printing, and sufficient adaptability to high-speed printing or double-sided printing may not be obtained. When the amount is too large, the printing dot diameter and the line width of letters/characters may increase, and image clarity may decrease.

—Surfactant—

For the surfactant, it is possible to use any of the following surfactants: an anionic surfactant, a cationic surfactant, a nonionic surfactant, an amphoteric surfactant and a fluorine-based surfactant. Each of these surfactants may be used alone or in combination with two or more. Among these, a nonionic surfactant and a fluorine-based surfactant are particularly preferable.

Examples of the anionic surfactant include alkyl allyl naphthalene sulfonates, alkyl naphthalene sulfonates, alkyl phosphates, alkyl sulfates, alkyl sulfonates, alkyl ether sulfates, alkyl sulfosuccinates, alkyl ester sulfates, alkyl benzene sulfonates, alkyl diphenyl ether disulfonates, alkyl aryl ether phosphates, alkyl aryl ether sulfates, alkyl aryl ether ester sulfates, olefin sulfonates, alkane olefin sulfonates, polyoxyethylene alkyl ether phosphates, polyoxyethylene alkyl ether sulfates, ether carboxylates, sulfosuccinates, α-sulfo fatty acid esters, fatty acid salts, condensates of higher fatty acids and amino acids, and naphthenates.

Examples of the cationic surfactant include alkylamine salts, dialkylamine salts, aliphatic amine salts, benzalkonium salts, quaternary ammonium salts, alkyl pyridinium salts, imidazolinium salts, sulfonium salts and phosphonium salts.

Examples of the nonionic surfactant include acetylene glycol-based surfactants, polyoxyethylene alkyl ethers, polyoxyethylene alkyl phenyl ethers, polyoxyethylene alkyl esters and polyoxyethylene sorbitan fatty acid esters.

Examples of the amphoteric surfactant include imidazoline derivatives such as imidazolinium betaine, dimethyl alkyl lauryl betaines, alkyl glycines and alkyl di(aminoethyl)glycines.

For the fluorine-based surfactant, any one of the compounds represented by the following Structural Formulae (I) to (III) can be favorably used.

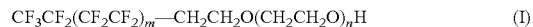

$$CF_3CF_2(CF_2CF_2)_m\text{—}CH_2CH_2O(CH_2CH_2O)_nH \quad (I)$$

In Structural Formula (I), "m" denotes an integer of 0 to 10, and "n" denotes an integer of 1 to 40.

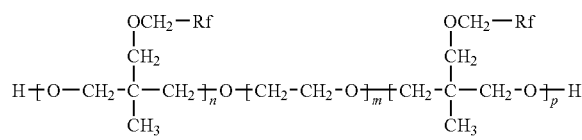

In Structural Formula (II), Rf denotes a fluorine-containing group, preferably a perfluoroalkyl group.

The perfluoroalkyl group preferably has 1 to 10 carbon atoms, more preferably 1 to 3 carbon atoms, and examples thereof include $C_nF_{2n-1}$ (where n denotes an integer of 1 to 10). Specific examples thereof include $CF_3$, $CF_2CF_3$, $C_3F_7$ and $C_4F_9$, with $CF_3$ and $CF_2CF_3$ being particularly preferable.

"m", "n" and "p" each denote an integer, with "m" preferably being 6 to 25, "n" preferably being 1 to 4 and "p" preferably being 1 to 4.

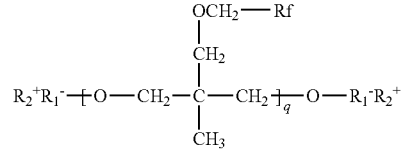

In Structural Formula (III), Rf denotes a fluorine-containing group, preferably a perfluoroalkyl group similar to any one of those mentioned for Structural Formula (II). Suitable examples thereof include $CF_3$, $CF_2CF_3$, $C_3F_7$ and $C_4F_9$.

$R_2$+ denotes a cation group. Examples thereof include quaternary ammonium groups; ions of alkali metals such as sodium and potassium; triethylamine; and triethanolamine. Among these, quaternary ammonium groups are particularly preferable.

$R^{1-}$ denotes an anion group, and examples thereof include $COO^-$, $SO^{3-}$, $SO^{4-}$ and $PO^{4-}$. "q" denotes an integer, preferably 1 to 6.

—Resin Fine Particle—

It is desirable that the recording inks in the present invention include resin fine particles, which may be contained in any one of the color inks and the black ink and may also be added, for example, to the organic solvent and the surfactant.

The resin fine particles are formed by dispersing in an aqueous medium a polymer produced by radical polymerization, emulsion polymerization, dispersion polymerization, seed polymerization, suspension polymerization, etc. The volume average particle diameter of the resin fine particles is preferably 10 nm to 300 nm, more preferably 50 nm to 200 nm.

Examples of resins for the resin fine particles can be classified into acrylic resin, methacrylic resin, styrene resin, urethane resin, acrylamide resin, polyester resin and butadiene resin, and these may be mixed or copolymerized. Also, these may be silicone-modified using a silane compound. Ideally, a silicone-modified acrylic resin obtained by polymerizing an acrylic monomer and a silane compound in the presence of an emulsifier is used, and the resin is preferably free of hydrolytic silyl groups. The silyl groups are hydrolyzed into silanol groups, and the silanol groups condense by dehydration to form siloxane bonds. Since the bonding energy of siloxane bonds in silicone resin is high, a coating film containing siloxane bonds is superior in rubfastness and solvent resistance. Additionally, if the hydrolytic silyl groups remain in the resin, the storage stability of the recording inks may degrade when the resin is used therein. Also, a silicone-modified acrylic resin is superior in thermal stability and thus enables stable ink ejection without causing kogation when a means of applying thermal energy so as to jet the inks is employed.

The mass ratio (C/D) of a carbon black content C in the black ink to a resin fine particle content D in the black ink is preferably in the range of 1/0.05 to 1/2, more preferably in the range of 1/0.2 to 1/1. When the resin fine particle content D is less than 0.05, sufficient image-fixing ability may not be obtained. When it is greater than 2, storage stability may degrade or ejection stability may decrease.

The above-mentioned other components are not particularly limited and may be suitably selected in accordance with the necessity. Examples thereof include a pH adjuster, an antiseptic/antifungal agent, an antirust agent, an antioxidant, a UV absorber, an oxygen absorber and a light stabilizer.

The pH adjuster is not particularly limited and any material may be used therefor in accordance with the intended use, as long as it can adjust the pH to 7 or greater without having an adverse effect on an ink to be prepared.

Examples of the pH adjuster include amines such as diethanolamine and triethanolamine; hydroxides of alkali metal elements such as lithium hydroxide, sodium hydroxide and potassium hydroxide; ammonium hydroxide, quaternary ammonium hydroxides and quaternary phosphonium hydroxides; and carbonates of alkali metals such as lithium carbonate, sodium carbonate and potassium carbonate.

Examples of the antiseptic/antifungal agent include 1,2-benzisothiazolin-3-one, sodium dehydroacetate, sodium sorbate, sodium 2-pyridinethiol-1-oxide, sodium benzoate and sodium pentachlorophenol.

Examples of the antirust agent include acid sulfites, sodium thiosulfate, ammonium thiodiglycolate, diisopropylammonium nitrate, pentaerythritol tetranitrate and dicyclohexylammonium nitrate.

Examples of the antioxidant include phenolic antioxidants (including hindered phenol antioxidants), amine antioxidants, sulfur antioxidants and phosphorus antioxidants.

Examples of the UV absorber include benzophenone UV absorbers, benzotriazole UV absorbers, salicylate UV absorbers, cyanoacrylate UV absorbers and nickel complex salt UV absorbers.

The properties of the recording inks of the present invention are not particularly limited and may be suitably selected in accordance with the intended use. For instance, it is desirable that the solid content, viscosity, surface tension, pH and the like of the recording inks be in the following ranges.

The solid content in the recording inks is preferably 3% by mass to 30% by mass, more preferably 6% by mass to 15% by mass. When the solid content is less than 6% by mass, sufficient image density may not be obtained after printing. Here, the solid content in each ink in the present invention primarily denotes a water-insoluble colorant and resin fine particles.

The viscosity is preferably 5 mPa·s to 20 mPa·s, more preferably 5 mPa·s to 10 mPa·s, at 25° C. When the viscosity is greater than 20 mPa·s, it may become difficult to secure ejection stability.

The surface tension is preferably 25 mN/m to 55 mN/m at 20° C. When the surface tension is less than 25 mN/m, bleeding on a recording medium may become conspicuous, and stable ink ejection may not be enabled. When it is greater than 55 mN/m, the inks do not sufficiently penetrate into a recording medium, and thus it may take a longer time for the inks to dry.

The pH is preferably 7 to 10, for instance.

The recording inks of the present invention can be suitably used in a variety of fields such as in image recording apparatuses (printers, etc.) each employing an ink jet recording method. For instance, the recording inks can be used in a printer which has a function of encouraging printing fixation by heating recording paper and the recording inks to a temperature of 50° C. to 200° C. during, before or after printing. The recording inks can be particularly suitably used in the ink cartridge, the ink recorded matter, the ink-jet recording apparatus and the ink-jet recording method of present invention described below.

(Ink Cartridge)

The ink cartridge used in the present invention includes a container to house the recording inks used in the present invention, and further includes other members, etc. suitably selected in accordance with the necessity.

The container is not particularly limited, and the shape, structure, size, material and the like thereof may be suitably selected in accordance with the intended use. Suitable examples thereof include a container having an ink bag or the like formed of an aluminum laminated film, resin film, etc.

Next, the ink cartridge will be explained with reference to FIGS. 1 and 2. Here, FIG. 1 is a diagram showing one example of the ink cartridge of the present invention, and FIG. 2 is a diagram exemplarily showing the ink cartridge of FIG. 1 with the inclusion of a case (exterior case).

Figure 2:
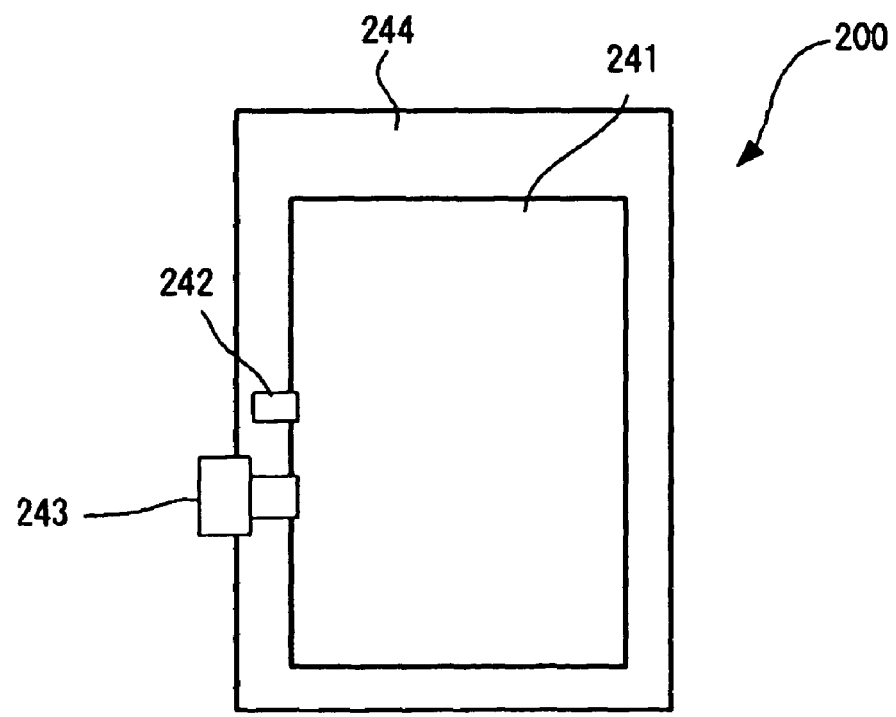
FIG. 2 is a schematic diagram exemplarily showing the ink cartridge of FIG. 1 with the inclusion of a case (exterior case).

In respect of an ink cartridge 200, as shown in FIG. 1, the recording inks of the present invention is supplied from an ink inlet 242 into an ink bag 241, and the ink inlet 242 is closed by means of fusion bonding after air is discharged. When the ink cartridge is used, an ink ejection outlet 243 made of a rubber member is pricked with a needle of an apparatus main body, and the ink is thus supplied to the apparatus.

The ink bag 241 is formed of an air-impermeable packing member such as an aluminum laminated film. As shown in FIG. 2, this ink bag 241 is normally housed in a plastic cartridge case 244 and detachably mounted on a variety of ink-jet recording apparatuses.

The ink cartridge of the present invention houses the recording inks (ink set) and can be detachably mounted on a variety of ink-jet recording apparatuses. It is particularly desirable that the ink cartridge be detachably mounted on the after-mentioned ink-jet recording apparatus of the present invention.

[Ink-jet Recording Apparatus and Ink-jet Recording Method]

The ink-jet recording apparatus of the present invention includes at least an ink jetting unit, and further includes other units suitably selected in accordance with the necessity, such as a stimulus generating unit and a controlling unit.

The ink-jet recording method of the present invention includes at least an ink jetting step, and further includes other steps suitably selected in accordance with the necessity, such as a stimulus generating step and a controlling step.

The ink-jet recording method of the present invention can be suitably performed by the ink-jet recording apparatus of the present invention, and the ink jetting step can be suitably performed by the ink jetting unit. Also, the other steps can be suitably performed by the other units.

—Ink Jetting Step and Ink Jetting Unit—

The ink jetting step is a step of jetting the recording inks of the present invention so as to record an image, by applying a stimulus to the recording inks.

The ink jetting unit is a unit configured to jet the recording inks of the present invention so as to record an image, by applying a stimulus to the recording inks. The ink jetting unit is not particularly limited, and examples thereof include nozzles for ejecting ink.

In the present invention, at least part of a liquid chamber, a fluid resistance unit, a diaphragm and a nozzle member of an ink-jet head is preferably formed of a material containing at least either silicone or nickel.

Also, the diameter of the ink-jet nozzle is preferably 30 μm or less, more preferably 1 μm to 20 μm.

Additionally, sub-tanks for supplying ink onto the ink-jet head are preferably provided such that the sub-tanks are replenished with ink from the ink cartridge via a supply tube.

The stimulus can, for example, be generated by the stimulus generating unit, and the stimulus is not particularly limited and may be suitably selected in accordance with the intended use. Examples thereof include heat (temperature), pressure, vibration and light. Each of these may be used alone or in combination with two or more. Among these, heat and pressure are suitable.

Examples of the stimulus generating unit include heaters, pressurizers, piezoelectric elements, vibration generators, ultrasonic oscillators and lights. Specific examples thereof include a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force.

The aspect of the jetting of the recording inks is not particularly limited and varies according to the type or the like of the stimulus. In the case where the stimulus is "heat", there is, for example, a method in which thermal energy corresponding to a recording signal is given to the recording inks in a recording head, using a thermal head or the like, bubbles are generated in the recording inks by the thermal energy, and the recording inks is ejected as droplets from nozzle holes of the recording head by the pressure of the bubbles. Meanwhile, in the case where the stimulus is "pressure", there is, for example, a method in which by applying voltage to a piezoelectric element bonded to a site called a pressure chamber that lies in an ink flow path in a recording head, the piezoelectric element bends, the volume of the pressure chamber decreases, and thus the recording inks are ejected as droplets from nozzle holes of the recording head.

It is desirable that the recording ink droplets jetted be, for example, 3 pL to 40 pL in size, 5 m/s to 20 m/s in ejection velocity, 1 kHz or greater in drive frequency and 300 dpi or greater in resolution.

It is desirable that the ink-jet recording apparatus include a reversing unit configured to reverse a recording surface of a recording medium and thus enable double-sided printing. Examples of the reversing unit include a conveyance belt which utilizes electrostatic force; a unit configured to hold a recording medium by sucking air; and a combination of a conveyance roller and a spur.

It is desirable that the ink-jet recording apparatus include an endless conveyance belt, and a conveyance unit configured to convey a recording medium by charging the surface of the conveyance belt so as to hold the recording medium. In this case, it is particularly desirable that the conveyance belt be charged by applying an AC bias of ±1.2 kV to ±2.6 kV to a charging roller.

The controlling unit is not particularly limited and may be suitably selected in accordance with the intended use, as long as it can control operations of the aforementioned units. Examples thereof include apparatuses such as a sequencer and a computer.

Figure 3:
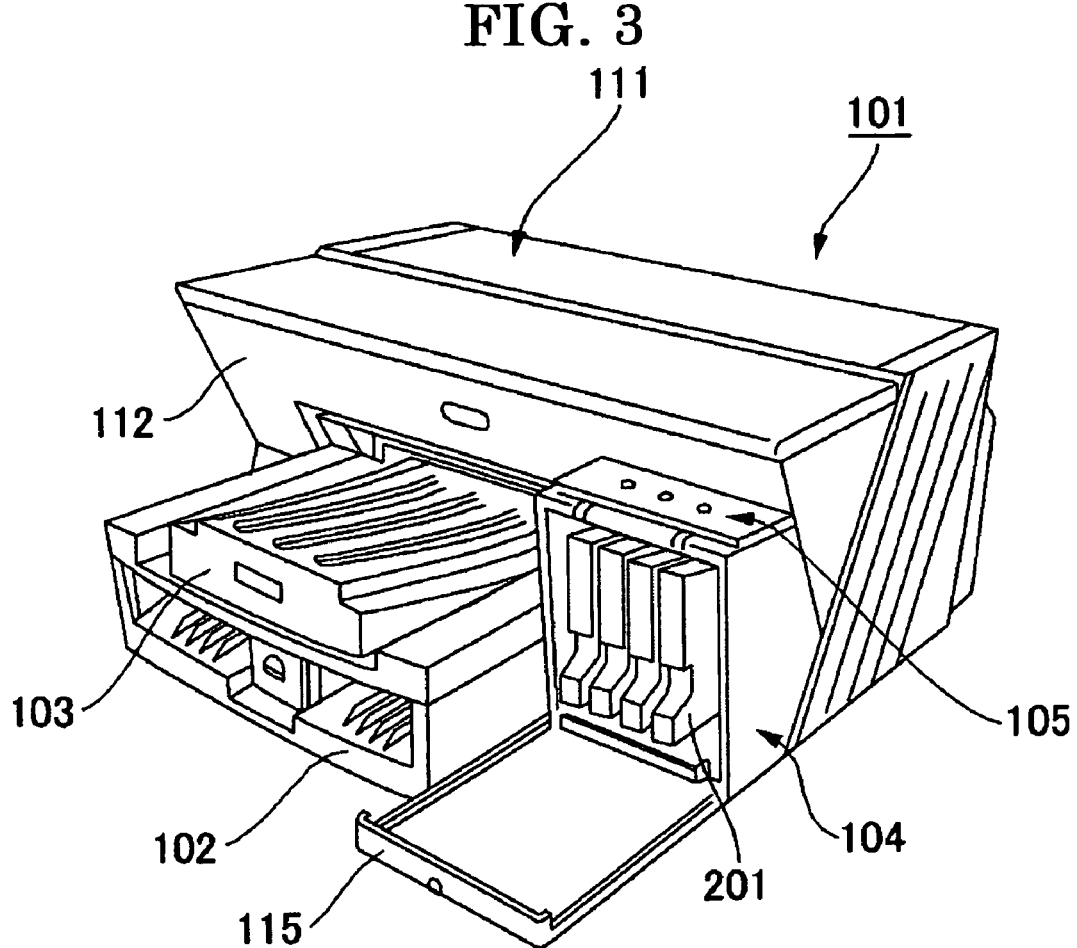
FIG. 3 is an explanatory perspective view exemplarily showing an ink-jet recording apparatus of the present invention when a cover provided at an ink cartridge loading section is open.

One aspect of performing the ink-jet recording method of the present invention by the ink-jet recording apparatus of the present invention will be explained with reference to the drawings. The ink-jet recording apparatus in FIG. 3 includes an apparatus main body 101, a paper feed tray 102 for feeding paper that is loaded thereon into the apparatus main body 101, a paper discharge tray 103 for storing paper which has been loaded into the apparatus main body 101 and on which images have been recorded (formed), and an ink cartridge loading section 104. An operation unit 105 composed of operation keys, a display and the like is placed on the upper surface of the ink cartridge loading section 104. The ink cartridge loading section 104 has a front cover 115 capable of opening and closing to attach and detach an ink cartridge 201.

Figure 4:
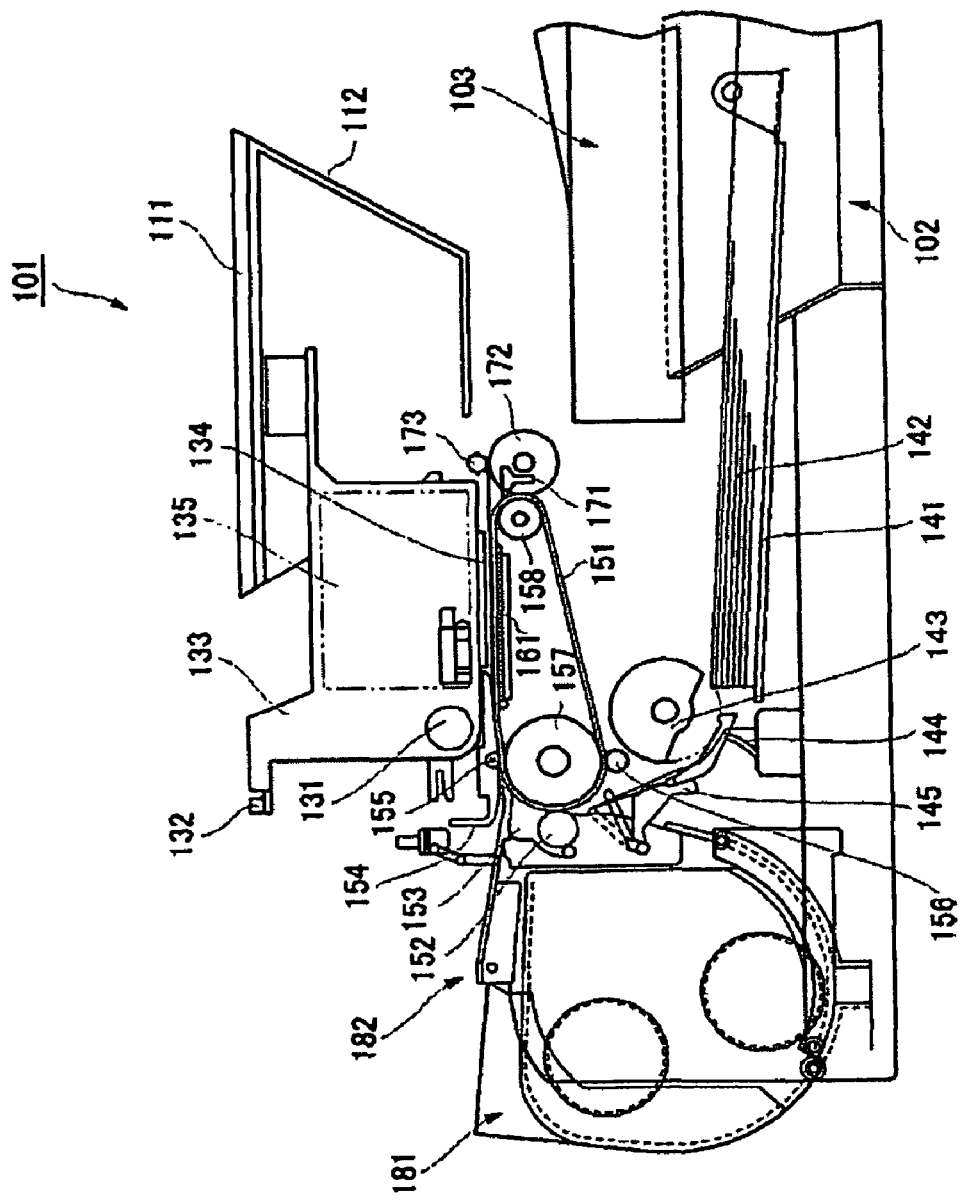
FIG. 4 is a schematic structural diagram for explaining the overall structure of an ink-jet recording apparatus of the present invention.
Figure 5:
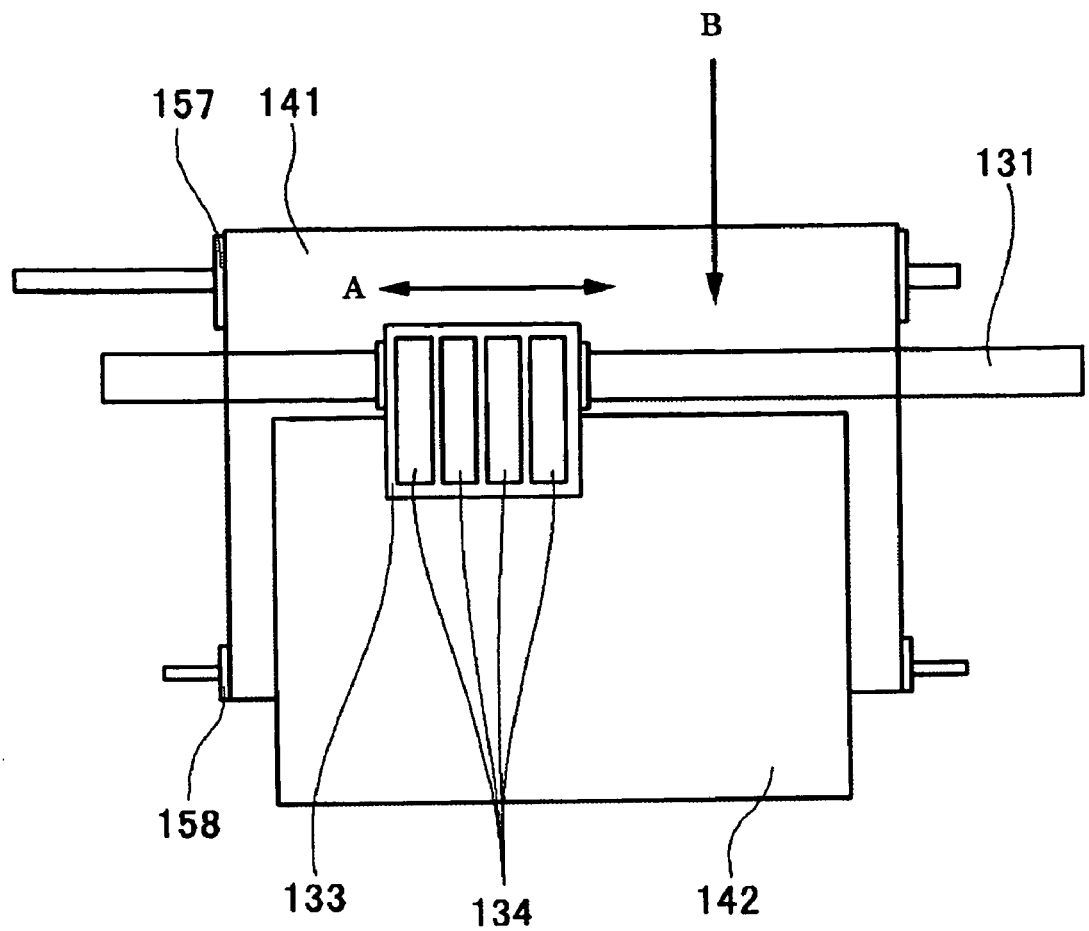
FIG. 5 is a schematic enlarged view showing one example of an ink-jet head in an ink-jet recording apparatus of the present invention.

In the apparatus main body 101, as shown in FIGS. 4 and 5, a carriage 133 is freely slidably held in the main scanning direction by a guide rod 131, which is a guide member laterally passed between left and right side plates (not depicted), and a stay 132; and the carriage 133 is moved for scanning in the direction indicated by the arrow A in FIG. 5 by a main scanning motor (not depicted). The belt moves in the direction indicated by the arrow B in FIG. 5 to convey paper.

A recording head 134 composed of four ink jet recording heads which eject recording ink droplets of yellow (Y), cyan (C), magenta (M) and black (Bk) is installed in the carriage 133 such that a plurality of ink ejection outlets are aligned in the direction intersecting the main scanning direction and that the ink droplet ejection direction faces downward.

For each of the ink-jet recording heads composing the recording head 134, it is possible to use, for example, a head provided with any of the following actuators as a energy-generating unit for ejecting a recording ink: a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force.

Also, the carriage 133 incorporates sub-tanks 135 of each color for supplying the inks of each color to the recording head 134. Each sub-tank 135 is supplied and replenished with the recording ink from the ink cartridge 201 loaded into the ink cartridge loading section 104, via a recording ink supply tube (not depicted).

Meanwhile, as a paper feed unit for feeding sheets of paper 142 loaded on a paper loading section (pressure plate) 141 of the paper feed tray 102, there are provided a half-moon roller (paper feed roller 143) which feeds the sheets of paper 142 one by one from the paper loading section 141, and a separation pad 144 which faces the paper feed roller 143 and is formed of a material with a large friction coefficient. This separation pad 144 is biased toward the paper feed roller 143 side.

As a conveyance unit for conveying the paper 142, which has been fed from this paper feed unit, under the recording head 134, there are provided a conveyance belt 151 for conveying the paper 142 by means of electrostatic adsorption; a counter roller 152 for conveying the paper 142, which is sent from the paper feed unit via a guide 145, such that the paper 142 is sandwiched between the counter roller 152 and the conveyance belt 151; a conveyance guide 153 for making the paper 142, which is sent upward in the substantially vertical direction, change its direction by approximately 90° and thusly correspond with the conveyance belt 151; and an end pressurizing roller 155 biased toward the conveyance belt 151 side by a pressing member 154. Also, there is provided a charging roller 156 as a charging unit for charging the surface of the conveyance belt 151.

The conveyance belt 151 is an endless belt and is capable of moving in circles in the belt conveyance direction, passed between a conveyance roller 157 and a tension roller 158. The conveyance belt 151 has, for example, a surface layer serving as a paper adsorbing surface, that is formed of a resinous material such as an ethylene-tetrafluoroethylene copolymer (ETFE) having a thickness of approximately 40 μm for which resistance control has not been conducted, and a back layer (intermediate resistance layer, ground layer) that is formed of the same material as this surface layer, for which resistance control has been conducted using carbon. On the back of the conveyance belt 151, a guide member 161 is placed correspondingly to a region where printing is carried out by the recording head 134. Additionally, as a paper discharge unit for discharging the paper 142 on which images or the like have been recorded by the recording head 134, there are provided a separation pawl 171 for separating the paper 142 from the conveyance belt 151, a paper discharge roller 172 and a paper discharge small roller 173, with the paper discharge tray 103 being placed below the paper discharge roller 172.

A double-sided paper feed unit 181 is mounted on a rear surface portion of the apparatus main body 101 in a freely detachable manner. The double-sided paper feed unit 181 takes in the paper 142 returned by rotation of the conveyance belt 151 in the opposite direction and reverses it, then refeeds it between the counter roller 152 and the conveyance belt 151. Additionally, a manual paper feed unit 182 is provided on an upper surface of the double-sided paper feed unit 181.

On receipt of a recording completion signal or such a signal as indicates that the rear end of the paper 142 has reached the recording region, recording operation is finished, and the paper 142 is discharged onto the paper discharge tray 103.

Once the amount of recording ink remaining in the sub-tanks 135 has been detected as too small, a required amount of recording ink is supplied from the ink cartridge 201 into the sub-tanks 135.

As to this ink-jet recording apparatus, when recording ink in the ink cartridge 201 has been used up, it is possible to replace only an ink bag inside the ink cartridge 201 by dismantling the housing of the ink cartridge 201. Also, even when the ink cartridge 201 is longitudinally placed and employs a front-loading structure, it is possible to supply recording ink stably. Therefore, even when the apparatus main body 101 is installed with little space over it, for example when the apparatus main body 101 is stored in a rack or when an object is placed over the apparatus main body 101, it is possible to replace the ink cartridge 201 with ease.

It should be noted that although the ink-jet recording method of the present invention has been explained referring to an example in which it is applied to a serial-type (shuttle-type) ink-jet recording apparatus where a carriage performs scanning, the ink-jet recording method of the present invention can also be applied to line-type ink-jet recording apparatuses provided with line-type heads.

Also, the ink-jet recording apparatus and the ink-jet recording method of the present invention can be applied to a variety of types of recording based upon inkjet recording systems. For example, they can be particularly suitably applied to ink-jet recording printers, facsimile apparatuses, copiers, printer/fax/copier complex machines, and so forth.

The following explains an ink-jet head to which the present invention is applied.

Figure 6:
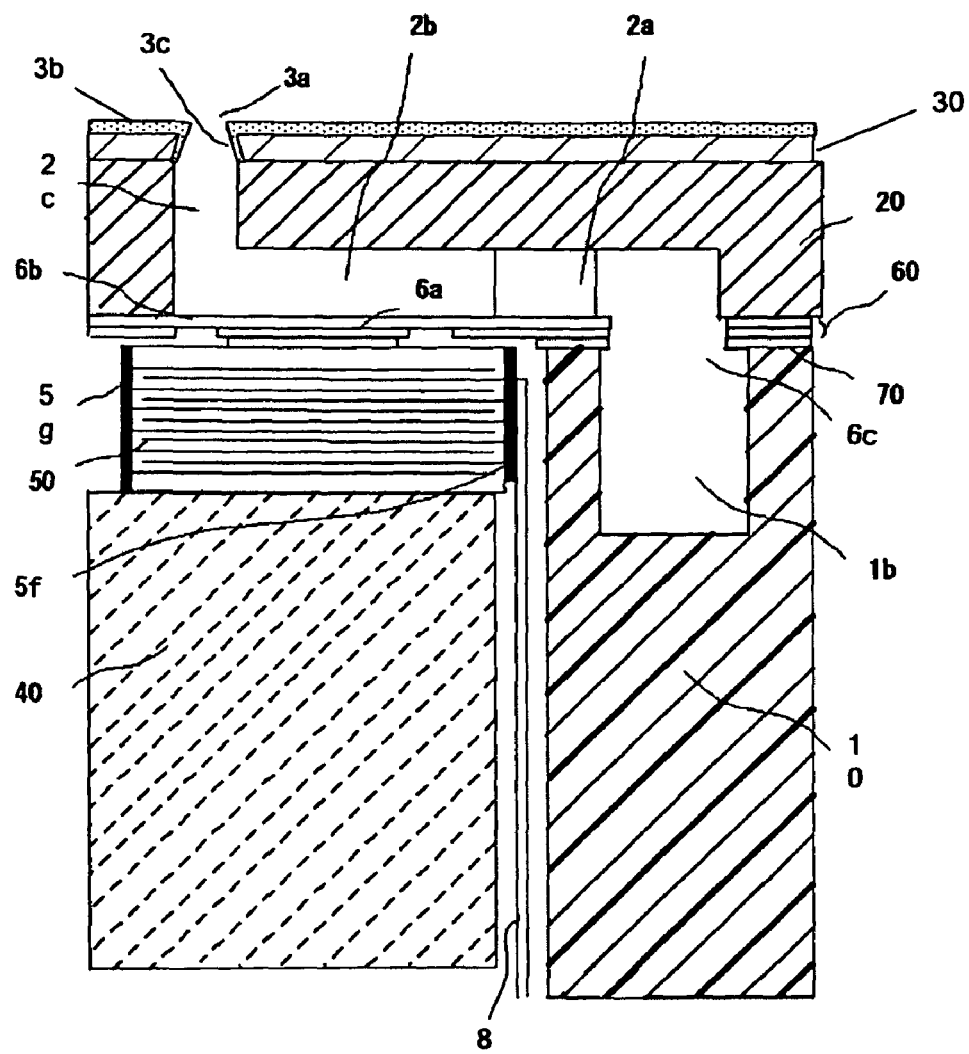
FIG. 6 is an enlarged view showing elements of one example of an ink-jet head in an ink-jet recording apparatus of the present invention.
Figure 7:
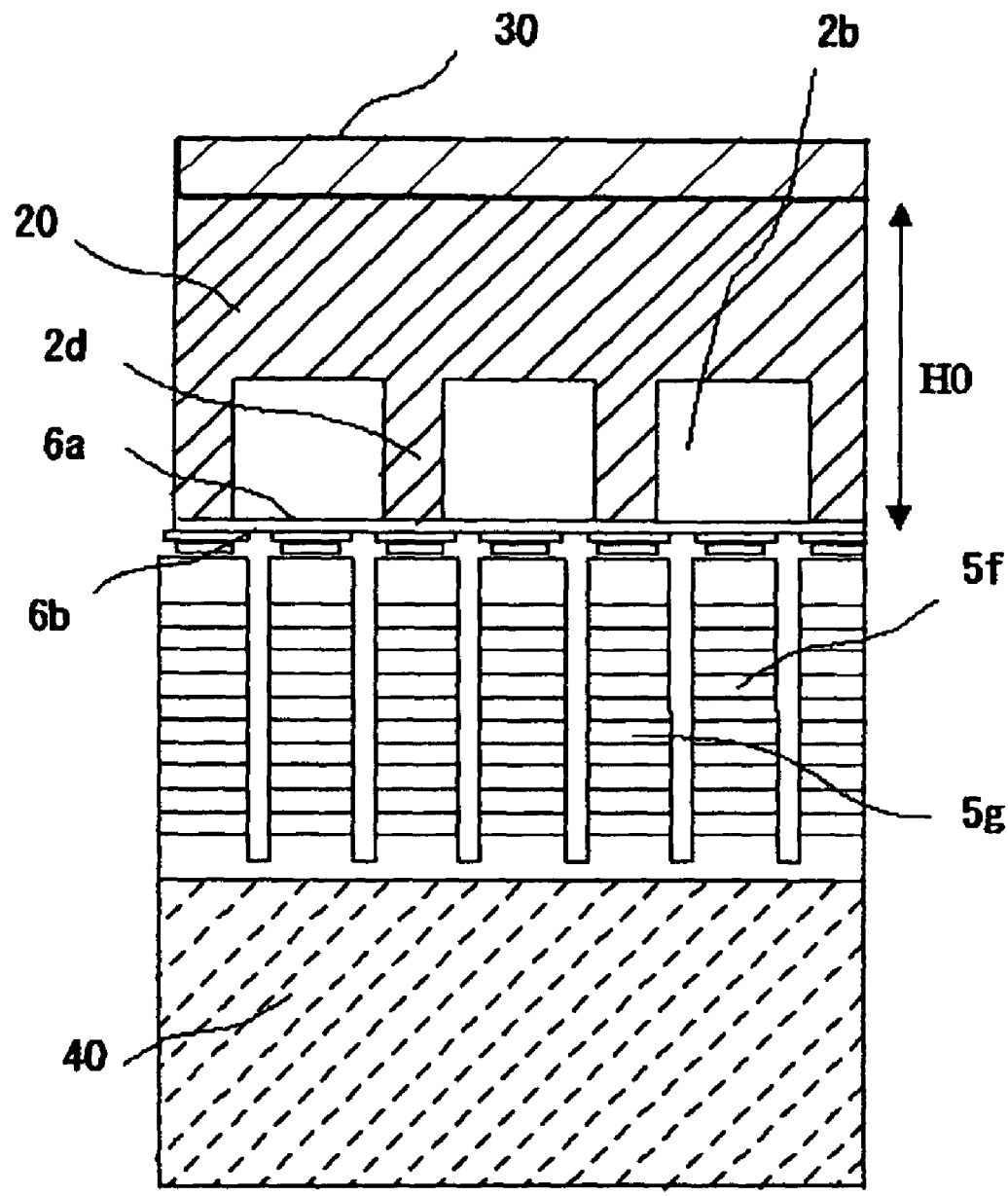
FIG. 7 is a schematic enlarged cross-sectional view exemplarily showing main parts of the ink-jet head of FIG. 6.

FIG. 6 is an enlarged view showing elements of an ink-jet head according to one embodiment of the present invention, and FIG. 7 is an enlarged cross-sectional view showing main parts of the ink-jet head with respect to the channel-to-channel direction.

This ink-jet head is composed of a frame 10 provided with an ink supply port (not depicted) and an indentation serving as a common liquid chamber 1b; a flow path plate 20 including a fluid resistance section 2a, an indentation serving as a pressurized liquid chamber 2b, and a communicating port 2c communicated with a nozzle 3a; a nozzle plate forming the nozzle 3a; a diaphragm 60 provided with a diaphragm protrusion 6a, a diaphragm part 6b and an ink flow-in port 6c; a laminated piezoelectric element 50 joined to the diaphragm 60 with an adhesive layer 70 placed in between; and a base 40 on which the laminated piezoelectric element 50 is fixed.

The base 40 is made of a barium titanate-based ceramic and joined to the laminated piezoelectric element 50 that is arranged in two rows.

In the laminated piezoelectric element 50, piezoelectric layers, which are formed of lead zirconate titanate (PZT) and each one of which is 10 μm to 50 μm in thickness, and internal electrode layers, which are formed of silver-palladium (AgPd) and each one of which is several micrometers in thickness, are alternately deposited on top of one another. The internal electrode layers are connected to external electrodes, at their ends on both sides. The laminated piezoelectric element 50 is formed into the shape of comb teeth by half-cut dicing, in which drive parts 5f and support parts (non-drive parts) 5g are alternately disposed. The length of the outer side of one of the external electrodes is limited by cutting or the like so as to be divided by half-cut dicing, and divided pieces serve as individual electrodes. The other side thereof is not divided by dicing but electrically continuous, serving as a common electrode.

An FPC 8 is welded to the individual electrodes of the drive parts. With an electrode layer provided at an end of the laminated piezoelectric element, the common electrode is joined to a Gnd electrode of the FPC 8 in a twisted manner. On the FPC 8, a driver IC (not depicted) is mounted, which controls application of drive voltage to the drive parts 5f.

The diaphragm 60 is equipped with the diaphragm part 6b formed as a thin film; the island-like convex portion (island part) 6a which is formed at the center of this diaphragm part 6b and joined to the drive parts 5f of the laminated piezoelectric element 50; a thick film portion including a beam joined to the support parts; and an opening serving as the ink flow-in port 6c, formed by combining two Ni-plated films produced by electroforming. The diaphragm portion has a thickness of 3 μm and a width of 35 μm (with respect to one side).

By patterning the adhesive layer 70 including a gap material, the island-like diaphragm protrusion 6a of the diaphragm 60 is bonded to the drive parts 5f of the laminated piezoelectric element 50, and the diaphragm 60 is bonded to the frame 10.

As to the flow path plate 20, the following members are patterned by etching with the use of a silicon single-crystal substrate: the fluid resistance section 2a; the indentation serving as the pressurized liquid chamber 2b; and a through-hole serving as the communicating port 2c, placed in a position corresponding to the nozzle 3a.

The portions that remain unetched serve as partitions 2d of the pressurized liquid chamber 2b. Additionally, this head is provided with a portion where the etching width is small to serve as the fluid resistance section 2a.

A nozzle plate 30 is formed of a metal material, for example an Ni-plated film produced by electroforming, and a large number of nozzles 3a, which are minute ejection outlets for jetting ink droplets, are formed therein. The internal shape (inner shape) of each of these nozzles 3a is similar to the shape of a horn (which may otherwise be a substantially columnar shape or a substantially conical and trapezoidal shape). Also, the diameter of each of these nozzles 3a is approximately 20 μm to 35 μm as a diameter on the side where ink droplets exit. Additionally, the nozzle pitch in each row is 150 dpi.

An ink ejection surface (on the nozzle surface side) of the nozzle plate 30 is provided with a water-repellent layer 3b (not depicted) which has been subjected to water-repellent surface treatment. High image quality is obtained through stabilization of the droplet shape and jetting properties of ink by providing a water-repellent film selected in accordance with the ink properties, which is produced by PTFE-Ni eutectoid plating, electrodeposition of a fluorine resin, vapor deposition coating of an evaporable fluorine resin (such as a fluorinated pitch), baking of a silicone resin and a fluorine resin after application of solvent, etc. For instance, as to the fluorine resin among these, although a variety of materials are known as fluorine resins, superior water repellency can be obtained by subjecting a modified perfluoropolyoxetane (product name: OPTOOL DSX, produced by Daikin Industries, Ltd.) to vapor deposition so as to have a thickness of 30 Å to 100 Å.

The frame 10 including the ink supply port and the indentation serving as the common liquid chamber 1b is produced by molding a resin.

As to the ink-jet head with such a structure, by applying a drive waveform (a pulse voltage of 10V to 50V) to the drive parts 5f correspondingly to a recording signal, displacement of the lamination direction is generated in the drive parts 5f, there is an increase in pressure as the pressurized liquid chamber 2b is pressurized via the diaphragm 60, and thus ink droplets are ejected from the nozzle 3a. Thereafter, once ejection of ink droplets is over, the ink pressure in the pressurized liquid chamber 2b lowers, and negative pressure is generated in the pressurized liquid chamber 2b due to inertia of the flow of ink and a drive pulse discharge process, which is followed by an ink supply step. On this occasion, the ink supplied from an ink tank flows into the common liquid chamber 1b, passes from the common liquid chamber 1b through the fluid resistance section 2a via the ink flow-in port 6c and then is supplied into the pressurized liquid chamber 2b.

The fluid resistance section 2a is effective in reducing residual pressure vibrations after ink ejection; conversely, it serves as a resistance to refilling effected by surface tension. By suitably selecting the fluid resistance section, it becomes possible to balance reduction in residual pressure and refill time and to shorten the time spent in shifting to an ink droplet ejecting operation that follows (the driving cycle).

EXAMPLE

The following explains Examples of the present invention; however, it should be noted that the present invention is not confined to these Examples in any way.

Synthesis Example 1

The atmosphere inside a 1 L flask equipped with a mechanical stirrer, a thermometer, a nitrogen gas introducing pipe, a reflux condenser and a dripping funnel was adequately replaced by nitrogen gas, then 11.2 g of styrene, 2.8 g of acrylic acid, 12.0 g of lauryl methacrylate, 4.0 g of polyethylene glycol methacrylate, 4.0 g of a styrene macromer (product name: AS-6 produced by Toagosei Co., Ltd.) and 0.4 g of mercaptoethanol were placed, and the temperature was raised to 65° C. Next, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of a styrene macromer (product name: AS-6 produced by Toagosei Co., Ltd.), 3.6 g of mercaptoethanol, 2.4 g of azobisdimethylvaleronitrile and 18 g of methyl ethyl ketone was poured dropwise into the flask in 2.5 hr. After the dropping of the mixed solution had finished, a mixed solution of 0.8 g of azobisdimethylvaleronitrile and 18 g of methyl ethyl ketone was applied dropwise into the flask in 0.5 hr. The ingredients were aged at 65° C. for 1 hr, then 0.8 g of azobismethylvaleronitrile was added, and further, the ingredients were aged for 1 hr. After reaction had finished, 364 g of methyl ethyl ketone was added into the flask, and 800 g of a polymer solution having a concentration of 50% by mass was thus obtained.

Synthesis Example 2

In a reaction container of an automated polymerization reaction apparatus (Polymerization Tester Model DSL-2AS, manufactured by Todoroki Sangyo Co., Ltd.) including the reaction container equipped with a stirrer, a dripping device, a temperature sensor and a reflux device having a nitrogen introducing device at an upper part thereof, 550 parts by mass of methyl ethyl ketone (MEK) was placed, and the atmosphere inside the reaction container was replaced by nitrogen gas while the ingredients were being stirred. With the nitrogen atmosphere inside the reaction container kept, the temperature was raised to 80° C., then a mixed solution of 75.0 parts by mass of 2-hydroxyethyl methacrylate, 77.0 parts by mass of methacrylic acid, 80.0 parts by mass of styrene, 150.0 parts by mass of butyl methacrylate, 98.0 parts by mass of butyl acrylate, 20.0 parts by mass of methyl methacrylate and 40.0 parts by mass of "Perbutyl (registered trademark) O" (active ingredient: t-butyl peroxy-2-ethylhexanoate, produced by Nippon Oils & Fats Co., Ltd.) was applied dropwise from the dripping device to the methyl ethyl ketone (MEK) for 4 hr. After the dropping of the mixed solution had finished, reaction was further continued at the same temperature for 15 hr, and an MEK solution of an anionic group-containing styrene-acrylic copolymer A which was 100 mgKOH/g in acid value, 21,000 in mass average molecular weight and 31°

C. (as a calculated value) in glass transition temperature (Tg) was thus obtained. After the reaction had finished, part of the MEK was removed by distillation under reduced pressure, and a copolymer A solution in which the nonvolatile content was adjusted to 50% was thus obtained.

Preparation Example 1

After sufficiently stirring 28g of the polymer solution synthesized in Synthesis Example 1, 26 g of carbon black (MONARCH 880, produced by Cabot Corporation), 13.6 g of 1 mol/L potassium hydroxide solution, 20 g of methyl ethyl ketone and 30 g of ion-exchange water, the ingredients were kneaded using a three-roll mill. The paste obtained was put into 200 g of ion-exchange water and sufficiently stirred, then the methyl ethyl ketone and the water were removed by distillation using an evaporator, and a water dispersion of water-insoluble vinyl polymer particles having a solid content of 20% by mass was thus obtained.

Preparation Example 2

Into 3 L of 2 mol/L sodium persulfate solution, 150 g of carbon black (TOKABLACK #7240, produced by Tokai Carbon Co., Ltd.) was added, then the mixture was stirred at a temperature of 60° C. for 10 hr so as to oxidize the carbon black. The oxidized carbon black was subjected to ultrafiltration to remove residual salt. Thereafter, the pH was adjusted to 8 by adding aqueous sodium hydroxide solution, then ultrafiltration was further carried out to remove excessive salts, and the aqueous solution obtained was adjusted by addition of purified water to have a solid content of 20% by mass. The volume average particle diameter of the dispersion obtained was 70 nm.

Preparation Example 3

In a mixing bath equipped with a jacket for cooling, 1,000 g of carbon black (#960, produced by Mitsubishi Chemical Corporation), 800 parts by mass of the copolymer A solution obtained in Synthesis Example 2, 143 parts by mass of 20% (by mass) sodium hydroxide solution, 100 parts by mass of methyl ethyl ketone (MEK) and 1,957 parts by mass of water were placed, then these were stirred and mixed. The mixed solution was introduced into a dispersing apparatus (SC Mill Model SC100/32, manufactured by Mitsui Mining. Co., Ltd.) filled with zirconia beads having a diameter of 0.3 mm, and then dispersed for 6 hr using a circulation method (a method in which a dispersion solution discharged from a dispersing apparatus is returned to a mixing bath). The rotational speed of the dispersing apparatus was 2,700 rpm, and by introducing cold water into the jacket for cooling, the temperature of the dispersion solution was kept at 40° C. or lower. After the dispersion had finished, undiluted dispersion solution was removed from the mixing bath, then the mixing bath and a dispersing apparatus flow path were washed with 10,000 parts by mass of water, and a diluted dispersion solution was obtained by mixing the water with the undiluted dispersion solution. The diluted dispersion solution was introduced into a glass distillation apparatus, and the whole of the MEK and part of the water were removed therefrom by distillation. After the diluted dispersion solution had been cooled to room temperature, the pH thereof was adjusted to 4.5 by dropping 10% by mass of hydrochloric acid thereto while being stirred, then the solid content was filtered out using a Nutsche filtration apparatus and washed with water. The filter cake was placed in a container, and 200 parts by mass of 20% (by mass) potassium hydroxide solution was added; thereafter, the mixture was dispersed using a disper (TK HOMODISPER Model 20, manufactured by Tokushu Kika Kogyo Co., Ltd), the nonvolatile content was adjusted by addition of water, and an aqueous pigment dispersion having a nonvolatile content of 20% was thus obtained in which the carbon black was dispersed in an aqueous medium as composite particles coated with a carboxyl group-containing styrene-acrylic copolymer neutralized with potassium hydroxide.

Preparation Example 4

A blue polymer fine particle dispersion was prepared similarly to the one in Preparation Example 1, except that the carbon black (MONARCH 880, produced by Cabot Corporation) in Preparation Example 1 was changed to a copper phthalocyanine pigment.

The average particle diameter (D50%) of the obtained polymer fine particles, measured using a particle size distribution measuring apparatus (MICROTRACK UPA, manufactured by Nikkiso Co., Ltd.), was 93 nm.

Preparation Example 5

Preparation of Polymer Fine Particle Dispersion Containing Dimethyl Quinacridone Pigment A reddish-purple polymer fine particle dispersion was prepared similarly to the one in Preparation Example 1, except that the carbon black (MONARCH 880, produced by Cabot Corporation) in Preparation Example 1 was changed to C. I. Pigment Red 122.

The average particle diameter (D50%) of the obtained polymer fine particles, measured using a particle size distribution measuring apparatus (MICROTRACK UPA, manufactured by Nikkiso Co., Ltd.), was 127 nm.

Preparation Example 6

Preparation of Polymer Fine Particle Dispersion Containing Monoazo Yellow Pigment A yellow polymer fine particle dispersion was prepared similarly to the one in Preparation Example 1, except that the carbon black (MONARCH 880, produced by Cabot Corporation) in Preparation Example 1 was changed to C. I. Pigment Yellow 74.

The average particle diameter (D50%) of the obtained polymer fine particles, measured using a particle size distribution measuring apparatus (MICROTRACK UPA, manufactured by Nikkiso Co., Ltd.), was 76 nm.

Preparation Example 7

Production of Recording Medium 1

A coating solution having a solid content concentration of 60% by mass was prepared by mixing a pigment, an adhesive and an assistant and adding water thereto, wherein the pigment denotes 70 parts by mass of clay, in which particles that are 2 μm or less in diameter occupy 97% by mass of all particles, and 30 parts by mass of heavy calcium carbonate having an average particle diameter of 1.1 μm; the adhesive denotes 8 parts by mass of styrene-butadiene copolymer emulsion having a glass transition temperature (Tg) of ±5° C., and 1 part by mass of phosphoric acid-esterified starch; and the assistant denotes 0.5 parts by mass of calcium stearate.

The coating solution obtained was applied onto both surfaces of the above-mentioned support using a blade coater, such that the amount of the coating solution attached to each surface was 8 g/m² as a solid content. Then the coating solution was subjected to a staged supercalender treatment after dried with hot air, and a "recording medium 1" was thus produced.

Preparation Example 8

Production of Recording Medium 2

A coating solution having a solid content concentration of 60% by mass was prepared by mixing a pigment, an adhesive and an assistant and adding water thereto, wherein the pigment denotes 70 parts by mass of clay, in which particles that are 2 μm or less in diameter occupy 97% by mass of all particles, and 30 parts by mass of heavy calcium carbonate having an average particle diameter of 1.1 μm; the adhesive denotes 7 parts by mass of styrene-butadiene copolymer emulsion having a glass transition temperature (Tg) of −5° C., and 0.7 parts by mass of phosphoric acid-esterified starch; and the assistant denotes 0.5 parts by mass of calcium stearate.

The coating solution obtained was applied onto both surfaces of the above-mentioned support using a blade coater, such that the amount of the coating solution attached to each surface was 8 g/m² as a solid content. Then the coating solution was subjected to a staged supercalender treatment after dried with hot air, and a "recording medium 2" was thus produced.

Next, the amount of purified water transferred to each of the recording medium 1, the recording medium 2, RICOH BUSINESS COAT GLOSS 100, AURORA COAT, LUMIRROR U10 and SUPER FINE PAPER was measured as follows. The results are shown in Table 1.

<Measurement of Amount of Purified Water Transferred, Using Dynamic Scanning Absorptometer>

The absorption curve of purified water was measured using a dynamic scanning absorptometer (Model: KS350D, manufactured by Kyowaseiko Corporation), with respect to each of the recording media. The absorption curve was made as a straight line with a fixed inclination by plotting transfer amount (mL/m²) against the square root of contact period (ms), and the values of the transfer amount after two different predetermined periods of time were measured by means of interpolation.

TABLE 1

| | Amount of purified water transferred to recording medium | |
|---|---|---|
| | (ml/m²) At contact period of 100 ms | (ml/m²) At contact period of 400 ms |
| RICOH BUSINESS COAT GLOSS 100 | 3.1 | 3.5 |
| AURORA COAT | 2.8 | 3.4 |
| Recording medium 1 | 10.1 | 20.2 |
| Recording medium 2 | 25.2 | 28.5 |
| LUMIRROR U10 | 0.1 | 0.1 |
| SUPER FINE PAPER | 41.0 | 44.8 |

Example 1

Ink compositions according to the following formulations were prepared, and inks were produced by filtering the ink compositions with a membrane filter of 0.8 μm in average pore diameter. Properties of the inks were evaluated in the following manner. The results are shown in Table 2.

| <Ink Composition (Black Ink Composition)> | |
|---|---|
| Water dispersion of water-insoluble vinyl polymer particles having a volume average particle diameter of 70 nm, obtained in Preparation Example 1: | 4.0% by mass (as a solid content) |
| 3-methyl-1,3-butanediol: | 28.0% by mass |
| Glycerin: | 13.0% by mass |
| 2-pyrrolidone: | 2.0% by mass |
| Surfactant represented by the following Structural Formula (II): | 1.0% by mass |

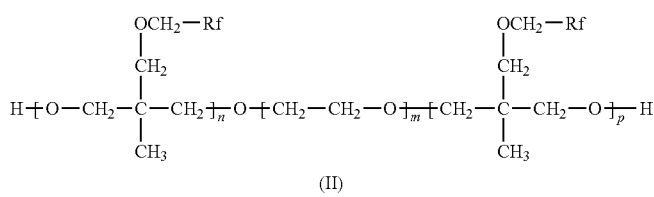

(II)

In Structural Formula (II), Rf denotes $CF_2CF_3$, "m" denotes 2, "n" denotes 4, and "p" denotes 4.

| Ion-exchange water: | 45.0% by mass |
|---|---|

| <Ink Composition (Cyan Ink Composition)> | |
|---|---|
| Polymer fine particle dispersion containing copper phthalocyanine pigment according to Preparation Example 4: | 15.0% by mass (as a solid content) |
| 3-methyl-1,3-butanediol: | 23.0% by mass |
| Glycerin: | 8.0% by mass |
| Surfactant represented by the following Structural Formula (II): | 1.0% by mass |

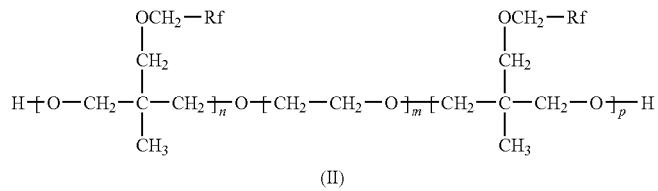

(II)

In Structural Formula (II), Rf denotes $CF_2CF_3$, "m" denotes 2, "n" denotes 4, and "p" denotes 4.

| Ion-exchange water: | 53.0% by mass |
|---|---|

| <Ink Composition (Magenta Ink Composition)> | |
|---|---|
| Polymer fine particle dispersion containing dimethyl quinacridone pigment according to Preparation Example 5: | 15.0% by mass (as a solid content) |
| 3-methyl-1,3-butanediol: | 23.0% by mass |
| Glycerin: | 8.0% by mass |
| Surfactant represented by the following Structural Formula (II): | 1.0% by mass |

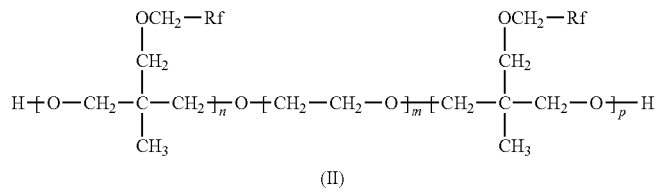

(II)

In Structural Formula (II), Rf denotes $CF_2CF_3$, "m" denotes 2, "n" denotes 4, and "p" denotes 4.

| Ion-exchange water: | 53.0% by mass |
|---|---|

| <Yellow Composition (Yellow Ink Composition)> | |
|---|---|
| Polymer fine particle dispersion containing monoazo yellow pigment according to Preparation Example 6: | 15.0% by mass (as a solid content) |
| 3-methyl-1,3-butanediol: | 23.0% by mass |
| Glycerin: | 8.0% by mass |
| Surfactant represented by the following Structural Formula (II): | 1.0% by mass |

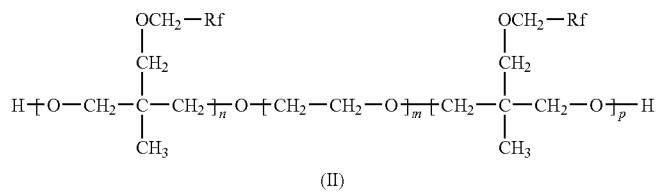

(II)

In Structural Formula (II), Rf denotes $CF_2CF_3$, "m" denotes 2, "n" denotes 4, and "p" denotes 4.

| Ion-exchange water: | 53.0% by mass |
|---|---|

<Volume Average Particle Diameter of Ink>

The volume average particle diameter (D50%) of each of the inks prepared was measured using a particle size distribution measuring apparatus (MICROTRACK UPA, manufactured by Nikkiso Co., Ltd.).

<Image Density>

The inks prepared were supplied to the ink-jet printer shown in FIGS. 3 to 7, then RICOH BUSINESS COAT GLOSS 100, a glossy medium, was printed with a solid image of composite black using a combination of the four colors, i.e. cyan, yellow, magenta and black, at a resolution of 1,200 dpi. After the image had dried, the density thereof was measured using a reflective color spectrophotometric colorimetry densitometer (manufactured by X-Rite, Inc.). The amount of the inks attached at this time was 9.5 g/m$^2$.

<Glossiness>

The inks prepared were supplied to the ink-jet printer shown in FIGS. 3 to 7, then RICOH BUSINESS COAT GLOSS 100 (background: 60°, glossiness: 21), a glossy medium, was printed with a solid image of composite black using a combination of the four colors, i.e. cyan, yellow, magenta and black, at a resolution of 1,200 dpi. After the image had dried, the glossiness at a light incidence angle of 60° was measured using a glossmeter (MICRO-GROSS 60°, manufactured by Atlas Material Testing Technology LLC).

<Image Quality>

The inks prepared were supplied to the inkjet printer shown in FIGS. 3 to 7, then RICOH BUSINESS COAT GLOSS 100 (background: 60°, glossiness: 21), a glossy medium, was printed with a solid image of composite black using a combination of the four colors, i.e. cyan, yellow, magenta and black, at a resolution of 1,200 dpi. After the image had dried, the quality thereof was judged by visual observation.

[Evaluation Criteria]
A: excellent
B: favorable
C: slightly inferior
D: inferior Example 2

Inks were produced similarly to the ones of Example 1, except that the average particle diameter of the water dispersion of the water-insoluble vinyl polymer particles containing carbon black was changed from 70 nm to 50 nm in the preparation of the ink compositions, and the inks of this example were evaluated. The results are shown in Table 2.

Example 3

Inks were produced similarly to the ones of Example 1, except that the average particle diameter of the water dispersion of the water-insoluble vinyl polymer particles containing carbon black was changed from 70 nm to 90 nm in the preparation of the ink compositions, and the inks of this example were evaluated. The results are shown in Table 2.

Example 4

Inks were produced similarly to the ones of Example 1, except that the water dispersion of the water-insoluble vinyl polymer particles containing carbon black was changed to the carbon black dispersion of Preparation Example 2 having a volume average particle diameter of 70 nm in the preparation of the ink compositions, and the inks of this example were evaluated. The results are shown in Table 2.

Example 5

Inks were produced similarly to the ones of Example 1, except that the water dispersion of Preparation Example 1 was changed to the water dispersion of Preparation Example 3 in the preparation of the ink compositions, and the inks of this example were evaluated. The results are shown in Table 2.

Example 6

Inks were produced similarly to the ones of Example 1, except that 6.5% by mass of silicone-modified acrylic resin fine particles were added to the black ink in the preparation of the ink compositions, and the inks of this example were evaluated. The results are shown in Table 2.

Example 7

Inks were evaluated similarly to the ones of Example 1, except that the additive amount of the water dispersion of the water-insoluble vinyl polymer particles containing carbon black was changed from 4.0% by mass to 5.0% by mass with respect to the ink compositions prepared. The results are shown in Table 2.

Example 8

Inks were evaluated similarly to the ones of Example 1, except that the additive amount of the water dispersion of the water-insoluble vinyl polymer particles containing carbon black was changed from 4.0% by mass to 3.0% by mass with respect to the ink compositions prepared. The results are shown in Table 2.

Example 9

Inks were evaluated similarly to the ones of Example 1, except that the recording medium was changed to AURORA COAT produced by Nippon Paper Industries Co., Ltd. The results are shown in Table 2.

Example 10

Inks were evaluated similarly to the ones of Example 1, except that the recording medium was changed to the "recording medium 1". The results are shown in Table 2.

Example 11

Inks were evaluated similarly to the ones of Example 1, except that the recording medium was changed to the "recording medium 2". The results are shown in Table 2.

Comparative Example 1

Inks were produced similarly to the ones of Example 1, except that the average particle diameter of the water dispersion of the water-insoluble vinyl polymer particles containing carbon black was changed from 70 nm to 20 nm in the preparation of the ink compositions, and the inks of this example were evaluated. The results are shown in Table 2.

Comparative Example 2

Inks were produced similarly to the ones of Example 1, except that the average particle diameter of the water dispersion of the water-insoluble vinyl polymer particles containing carbon black was changed from 70 nm to 150 nm in the preparation of the ink compositions, and the inks of this example were evaluated. The results are shown in Table 2.

Comparative Example 3

Inks were evaluated similarly to the ones of Example 1, except that the printed medium was changed from RICOH BUSINESS COAT GLOSS 100, a glossy medium, to a film material (LUMIRROR U10, produced by Toray Industries, Inc.) with respect to the ink compositions prepared. The results are shown in Table 2.

Comparative Example 4

Inks were evaluated similarly to the ones of Example 1, except that the printed medium was changed from RICOH BUSINESS COAT GLOSS 100, a glossy medium, to a glossy medium (SUPER FINE PAPER, produced by Seiko Epson Corporation) with respect to the ink compositions prepared. The results are shown in Table 2.

Comparative Example 5

Inks were evaluated similarly to the ones of Example 1, except that a solid image of black was printed using only a black ink. The results are shown in Table 2.

Comparative Example 6

Inks were evaluated similarly to the ones of Example 1, except that the additive amount of the water dispersion of the water-insoluble vinyl polymer particles containing carbon black was changed from 4.0% by mass to 6.0% by mass with respect to the ink compositions prepared. The results are shown in Table 2.

Comparative Example 7

Inks were evaluated similarly to the ones of Example 1, except that the additive amount of the water dispersion of the water-insoluble vinyl polymer particles containing carbon black was changed from 4.0% by mass to 8.0% by mass with respect to the ink compositions prepared. The results are shown in Table 2.

Comparative Example 8

Inks were evaluated similarly to the ones of Example 1, except that the additive amount of the water dispersion of the water-insoluble vinyl polymer particles containing carbon black was changed from 4.0% by mass to 2.0% by mass with respect to the ink compositions prepared. The results are shown in Table 2.

TABLE 2

|  | Image density | Glossiness at a light incidence angle of 60° | Image quality |
| --- | --- | --- | --- |
| Example 1 | 2.00 | 40 | A |
| Example 2 | 1.74 | 45 | A |
| Example 3 | 1.67 | 33 | A |
| Example 4 | 1.47 | 30 | A |
| Example 5 | 1.74 | 31 | A |
| Example 6 | 2.05 | 41 | A |
| Example 7 | 2.11 | 46 | B |
| Example 8 | 1.85 | 38 | B |
| Example 9 | 1.49 | 32 | B |
| Example 10 | 1.55 | 36 | B |
| Example 11 | 1.66 | 38 | B |
| Comparative Example 1 | 1.25 | 21 | C |
| Comparative Example 2 | 1.21 | 20 | C |
| Comparative Example 3 | 2.28 | Impossible to measure | D |
| Comparative Example 4 | 1.28 | 18 | C |
| Comparative Example 5 | 1.64 | 32 | D |
| Comparative Example 6 | 2.17 | 50 | C |
| Comparative Example 7 | Not evaluated because of discharge failure | | |
| Comparative Example 8 | 1.26 | 22 | C |

Judging from Table 2, it was found that all of the recordings inks of Examples 1 to 11 had high image densities on glossy media and superior glossiness and image quality, in comparison with the recording inks of Comparative Examples 1 to 8.

INDUSTRIAL APPLICABILITY

The ink-jet recording apparatus and the ink-jet recording method of the present invention can be used in a variety of types of recording based upon ink-jet recording systems. For example, they can be particularly suitably applied to ink-jet recording printers, facsimile apparatuses, copiers, printer/fax/copier complex machines, and so forth.

The invention claimed is:

1. An ink-jet recording method, comprising:
  recording onto a recording medium a black image of composite black using a combination of a black ink and color inks,
  wherein the black ink comprises water, a water-soluble organic solvent, a surfactant, and a carbon black whose volume average particle diameter is 40 nm to 100 nm, and the color inks comprise a cyan ink containing a cyan pigment, a magenta ink containing a magenta pigment, and a yellow ink containing a yellow pigment,
  wherein a mass ratio (A/B) of a solid content A in the black ink to a water-soluble organic solvent content B in the black ink is in the range of 1/8 to 1/15, and
  wherein the recording medium comprises a support, and a coating layer applied onto at least one surface of the support, the amount of purified water transferred to the recording medium at a contact period of 100 ms measured by a dynamic scanning absorptometer at a temperature of 23° C. and a relative humidity of 50% is 2 ml/m$^2$ to 35 ml/m$^2$, and the amount of purified water transferred to the recording medium at a contact period of 400 ms measured by the dynamic scanning absorptometer at a temperature of 23° C. and a relative humidity of 50% is 3 ml/m$^2$ to 40 ml/m$^2$.

2. The ink-jet recording method according to claim 1, wherein the black ink and the color inks contain resin fine particles whose volume average particle diameter is 10 nm to 300 nm.

3. The ink-jet recording method according to claim 2, wherein a mass ratio (C/D) of a carbon black content C in the black ink to a resin fine particle content D in the black ink is in the range of 1/0.05 to 1/2.

4. The ink-jet recording method according to claim 2, wherein the resin fine particles are selected from acrylic resin fine particles, methacrylic resin fine particles, styrene resin fine particles, urethane resin fine particles, acrylamide resin fine particles, polyester resin fine particles, butadiene resin fine particles, and resin fine particles produced by mixing these fine particles.

5. The ink-jet recording method according to claim 1, wherein the carbon black is coated with a water-insoluble vinyl polymer.

6. The ink-jet recording method according to claim 1, wherein the carbon black includes a hydrophilic group on a surface thereof, and the hydrophilic group is a functional group selected from —COOM, —COOH, —$SO_3M$, —$SO_3H$, —$PO_3HM$, —$PO_3M_2$, —$PO_3H_2$, —$SO_2NH_2$ and —$SO_2NHCOR$, where M denotes an alkali metal, ammonium or an organic ammonium, and R denotes an alkyl group having 1 to 12 carbon atoms, a phenyl group that may have a substituent, or a naphthyl group that may have a substituent.

7. The ink-jet recording method according to claim 1, wherein the carbon black is dispersed by the surfactant.

8. The ink-jet recording method according to claim 1, wherein the carbon black includes a graft polymer group on a surface thereof.

9. The ink-jet recording method according to claim 1, wherein the black ink comprises one of a polymeric dispersant having an anionic group or cationic group on a surface thereof, and a carbon black whose surface is directly or indirectly coated with a compound having an anionic group or cationic group.

10. The ink-jet recording method according to claim 1, wherein the water-soluble organic solvent is at least one selected from the group consisting of glycerin, ethylene glycol, diethylene glycol, triethylene glycol, propylene glycol, dipropylene glycol, tripropylene glycol, 2-methyl-1,3-propanediol, 1,3-butanediol, 2,3-butanediol, 1,4-butanediol, 2-methyl-1,3-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone and N-hydroxyethyl-2-pyrrolidone.

11. The ink-jet recording method according to claim 1, wherein the coating layer of the recording medium has a solid content of 0.5 $g/m^2$ to 20.0 $g/m^2$, and the recording medium has a basis weight of 50 $g/m^2$ to 250 $g/m^2$.

12. The ink-jet recording method according to claim 1, wherein the amount of ink attached to the recording medium is 1.5 $g/m^2$ to 15 $g/m^2$.

13. An ink-jet recorded matter recorded by an ink jet recording method, comprising:
a solid recorded portion having an image density of 2.0 or greater and a glossiness of 50 or greater at a light incidence angle of 60°,
wherein the ink-jet recording method comprises recording onto a recording medium a black image of composite black using a combination of a black ink and color inks,
wherein the black ink comprises water, a water-soluble organic solvent, a surfactant, and a carbon black whose volume average particle diameter is 40 nm to 100 nm, and the color inks comprise a cyan ink containing a cyan pigment, a magenta ink containing a magenta pigment, and a yellow ink containing a yellow pigment,
wherein a mass ratio (A/B) of a solid content A in the black ink to a water-soluble organic solvent content B in the black ink is in the range of 1/8 to 1/15, and
wherein the recording medium comprises a support, and a coating layer applied onto at least one surface of the support, the amount of purified water transferred to the recording medium at a contact period of 100 ms measured by a dynamic scanning absorptometer at a temperature of 23° C. and a relative humidity of 50% is 2 $ml/m^2$ to 35 $ml/m^2$, and the amount of purified water transferred to the recording medium at a contact period of 400 ms measured by the dynamic scanning absorptometer at a temperature of 23° C. and a relative humidity of 50% is 3 $ml/m^2$ to 40 $ml/m^2$.

14. An ink-jet recording apparatus for obtaining an ink-jet recorded matter, recorded by an ink-jet recording method, the apparatus comprising:
an ink jetting unit configured to jet inks so as to record an image, by applying a stimulus to the inks,
wherein the ink-jet recorded matter comprises a solid recorded portion having an image density of 2.0 or greater and a glossiness of 50 or greater at a light incidence angle of 60°,
wherein the ink-jet recording method comprises recording onto a recording medium a black image of composite black using a combination of a black ink and color inks,
wherein the black ink comprises water, a water-soluble organic solvent, a surfactant, and a carbon black whose volume average particle diameter is 40 nm to 100 nm, and the color inks comprise a cyan ink containing a cyan pigment, a magenta ink containing a magenta pigment, and a yellow ink containing a yellow pigment,
wherein a mass ratio (A/B) of a solid content A in the black ink to a water-soluble organic solvent content B in the black ink is in the range of 1/8 to 1/15, and
wherein the recording medium comprises a support, and a coating layer applied onto at least one surface of the support, the amount of purified water transferred to the recording medium at a contact period of 100 ms measured by a dynamic scanning absorptometer at a temperature of 23° C. and a relative humidity of 50% is 2 $ml/m^2$ to 35 $ml/m^2$, and the amount of purified water transferred to the recording medium at a contact period of 400 ms measured by the dynamic scanning absorptometer at a temperature of 23° C. and a relative humidity of 50% is 3 $ml/m^2$ to 40 $ml/m^2$.

15. The ink-jet recording apparatus according to claim 14, wherein the black ink and the color inks contain resin fine particles whose volume average particle diameter is 10 nm to 300 nm.

16. The ink-jet recording apparatus according to claim 15, wherein a mass ratio (C/D) of a carbon black content C in the black ink to a resin fine particle content D in the black ink is in the range of 1/0.05 to 1/2.

17. The ink-jet recording method according to claim 14, wherein the carbon black includes a coating of a water-insoluble vinyl polymer.

18. The ink-jet recording apparatus according to claim 14, wherein the carbon black includes a hydrophilic group on a surface thereof, and the hydrophilic group is a functional group selected from —COOM, —COOH, —$SO_3M$, —$SO_3H$, —$PO_3HM$, —$PO_3M_2$, —$PO_3H_2$, —$SO_2NH_2$ and —$SO_2NHCOR$, where M denotes an alkali metal, ammonium or an organic ammonium, and R denotes an alkyl group having 1 to 12 carbon atoms, a phenyl group that may have a substituent, or a naphthyl group that may have a substituent.

19. The ink-jet recording apparatus according to claim 14, wherein the carbon black includes a graft polymer group on a surface thereof.

20. The ink-jet recording apparatus according to claim 14, wherein the black ink comprises one of a polymeric dispersant having an anionic group or cationic group on a surface thereof, and a carbon black whose surface is directly or indirectly coated with a compound having an anionic group or cationic group.

* * * * *